US012750771B2

(12) United States Patent
Sun

(10) Patent No.: US 12,750,771 B2
(45) Date of Patent: Sep. 29, 2026

(54) NETWORK CODING METHOD AND APPARATUS

(71) Applicant: HUAWEI TECHNOLOGIES CO., LTD., Shenzhen (CN)

(72) Inventor: Huan Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 573 days.

(21) Appl. No.: 17/976,012

(22) Filed: Oct. 28, 2022

(65) Prior Publication Data

US 2023/0067470 A1 Mar. 2, 2023

Related U.S. Application Data

(63) Continuation of application No. PCT/CN2021/088804, filed on Apr. 21, 2021.

(30) Foreign Application Priority Data

Apr. 30, 2020 (CN) ......................... 202010364804.5

(51) Int. Cl.

*H04W 48/20* (2009.01)
*H04L 5/00* (2006.01)
(Continued)

(52) U.S. Cl.

CPC ........... *H04W 48/20* (2013.01); *H04L 5/0048* (2013.01); *H04W 48/16* (2013.01); *H04W 72/0446* (2013.01)

(58) Field of Classification Search

CPC ................. H04W 48/20; H04W 48/16; H04W 72/0446; H04L 5/0048; H04L 1/0076;
(Continued)

(56) References Cited

U.S. PATENT DOCUMENTS 8,233,412 B1 * 7/2012 Abbey .................. H04B 1/001 370/256
11,075,786 B1 * 7/2021 Shattil ..................... H04L 45/24
(Continued)

FOREIGN PATENT DOCUMENTS

CN 101836369 A 9/2010
CN 102158891 A 8/2011
(Continued)

OTHER PUBLICATIONS

R1-090061, Alcatel-Lucent Shanghai Bell et al, Applications of network coding in LTE-A, 3GPP TSG-RAN Wg RAN1#55bis, Ljubljana, Slovenia, Jan. 12-16, 2009, 8 pages.
(Continued)

*Primary Examiner* — Redentor Pasia
*Assistant Examiner* — Theodore Im

(57) ABSTRACT

A network coding method and an apparatus are disclosed. According to the network coding method, a first terminal device determines first indication information, where the first indication information indicates whether to preprocess a phase of first to-be-coded data to be sent by the first terminal device; and transmits data to a second terminal device in a same slot of a same transmission resource through an electromagnetic hypersurface array antenna, where the transmitting includes: sending third to-be-coded data to the electromagnetic hypersurface array antenna in a first slot of a second transmission resource, and receiving first network coded data from the electromagnetic hypersurface array antenna in the first slot, where the third to-be-coded data is obtained based on the first indication information and the first to-be-coded data; and obtaining second to-be-coded data from the second terminal device based on the third to-be-coded data and the first network coded data.

19 Claims, 11 Drawing Sheets

(51) Int. Cl.
*H04W 48/16* (2009.01)
*H04W 72/0446* (2023.01)

(58) Field of Classification Search
CPC ...... H04L 27/26035; H04N 2201/3238; H04B 7/15521
See application file for complete search history.

(56) References Cited

U.S. PATENT DOCUMENTS

| | | | | |
|---|---|---|---|---|
| 2007/0184826 | A1* | 8/2007 | Park | H04B 7/15521 455/11.1 |
| 2011/0026429 | A1* | 2/2011 | Ben Slimane | H04L 1/0026 370/252 |
| 2014/0112184 | A1* | 4/2014 | Chai | H04L 41/0853 370/252 |
| 2016/0241323 | A1* | 8/2016 | Ko | H04L 5/0048 |
| 2016/0323892 | A1* | 11/2016 | Pradini | H04B 7/15557 |
| 2016/0365966 | A1* | 12/2016 | Bennett | H04B 7/04 |
| 2017/0079039 | A1* | 3/2017 | Gerszberg | H04W 72/21 |
| 2018/0054218 | A1* | 2/2018 | Qian | H04L 5/005 |
| 2019/0021626 | A1* | 1/2019 | Cano Garcia | A61B 5/0507 |
| 2019/0349058 | A1* | 11/2019 | Raghavan | H04B 7/0808 |
| 2021/0083735 | A1* | 3/2021 | Sundararajan | H04L 5/0017 |
| 2021/0336658 | A1* | 10/2021 | Shimon | H04B 7/0413 |
| 2022/0231738 | A1* | 7/2022 | Haustein | H04B 7/0456 |
| 2023/0006764 | A1* | 1/2023 | Jiang | H04L 1/1893 |

FOREIGN PATENT DOCUMENTS

| | | | |
|---|---|---|---|
| CN | 102571274 | A | 7/2012 |
| CN | 108667559 | A | 10/2018 |
| CN | 110855403 | A | 2/2020 |
| EP | 2216954 | A1 | 8/2010 |
| WO | 2019043098 | A1 | 3/2019 |

OTHER PUBLICATIONS

Lili Wei et al, Network Coding in Multiple Access Relay Channel with Multiple Antenna Relay, 2014 International Conference on Computing, Networking and Communications, Wireless Communications Symposium, 6 pages.
Peng De-yi, Research for Key Technology of 5 G Wireless Network PHY Based on Machine Learning, Journal of Hunan Institute of Engineering, vol. 29, No. 3, Sep. 2019, with the English Abstract, 7 pages.
International Search Report and Written Opinion issued in PCT/CN2021/088804, dated Jul. 21, 2021, 8 pages.
Office Action issued in CN202010364804.5, dated Mar. 23, 2022, 6 pages.

* cited by examiner

NETWORK CODING METHOD AND APPARATUS

CROSS-REFERENCE TO RELATED APPLICATIONS

This application is a continuation of International Application No. PCT/CN2021/088804, filed on Apr. 21, 2021, which claims priority to Chinese Patent Application No. 202010364804.5, filed on Apr. 30, 2020. The disclosures of the aforementioned applications are hereby incorporated by reference in their entireties.

TECHNICAL FIELD

This application relates to the communication field, and in particular, to a network coding method and an apparatus.

BACKGROUND

A network coding (NC) technology is an information exchange technology that integrates routing and coding. Maximum traffic of routing transmission can be reached through network coding, and data transmission efficiency is improved. In a 5th generation (5G) massive connectivity system, to improve data transmission efficiency between terminal devices, the network coding technology starts to be used in data transmission at a physical layer. Network coding at the physical layer is implemented over an air interface channel, and indirect data transmission may be implemented between two terminal devices through forwarding by a relay node. After receiving data, the relay node first performs network coding, and then sends coded data. However, in this manner, it takes a given period of time for the relay node to perform network coding, and therefore the data transmission efficiency is low.

SUMMARY

Embodiments of this application provide a network coding method and an apparatus, to improve efficiency of indirect data transmission between two terminal devices.

To achieve the foregoing objectives, the following technical solutions are used in embodiments of this application.

According to a first aspect, a network coding method is provided, and it includes: A first terminal device determines first indication information, where the first indication information indicates whether to preprocess a phase of first to-be-coded data to be sent by the first terminal device; and that data is transmitted between the first terminal device and a second terminal device in a same slot of a same transmission resource through an electromagnetic hypersurface array antenna includes: The first terminal device sends third to-be-coded data to the electromagnetic hypersurface array antenna in a first slot of a second transmission resource, and receives first network coded data from the electromagnetic hypersurface array antenna in the first slot, where the third to-be-coded data is obtained based on the first indication information and the first to-be-coded data; and the first terminal device obtains second to-be-coded data from the second terminal device based on the third to-be-coded data and the first network coded data.

According to the network coding method provided in this embodiment of this application, either of the two terminal devices preprocesses the phase of the to-be-coded data, sends the to-be-coded data to the electromagnetic hypersurface array antenna in the same slot of the same transmission resource, and implements time-domain network coding and distribution on the electromagnetic hypersurface array antenna, that is, performs time domain superposition and reflection on a signal. Data sending, network coding, and receiving are completed in the same slot. This improves efficiency of indirect data transmission between the two terminal devices.

In a possible implementation, that a first terminal device determines first indication information includes: The first terminal device receives the first indication information from a network device. In this implementation, the network device configures the first indication information, the first terminal device does not need to negotiate with the second terminal device, and no additional transmission resource is occupied.

In a possible implementation, before that the first terminal device receives the first indication information from a network device, the method further includes: The first terminal device sends first information to the network device, where the first information includes at least one of: first request information, an interference level of the first terminal device, and a processing capability of the first terminal device, where the first request information is used to request whether to preprocess the phase of the first to-be-coded data, and the first information is used to determine the first indication information. The interference level of the terminal device includes self-interference between a transmit antenna and a receive antenna of the terminal device, interference from another terminal device to the terminal device, or a sum of the foregoing two types of interference. The processing capability of the terminal device is a capability of the terminal device to preprocess the phase of the to-be-coded data. The network device may select a terminal device with a low interference level and a strong processing capability to preprocess the phase of the to-be-coded data. Alternatively, the terminal device actively requests to preprocess the phase of the to-be-coded data.

In a possible implementation, that a first terminal device determines first indication information includes: The first terminal device receives third indication information from a network device, where the third indication information indicates the first terminal device to negotiate a first transmission resource of the first indication information with the second terminal device; and the first terminal device determines the first indication information based on a result of the negotiation with the second terminal device on the first transmission resource. The first terminal device may negotiate with the second terminal device based on a requirement (for example, during data transmission), to determine the first indication information.

In a possible implementation, the method further includes: The first terminal device receives fourth indication information from the network device, where the fourth indication information indicates the second transmission resource that carries the data transmitted between the first terminal device and the second terminal device through the electromagnetic hypersurface array antenna. The network device may first send the first indication information and the second indication information, and then send the fourth indication information when the data is transmitted between the first terminal device and the second terminal device. If no data needs to be transmitted, the fourth indication information may not be sent. Alternatively, the network device may first send the fourth indication information, and then send the first indication information and the second indication information when the data is transmitted between the first terminal device and the second terminal device. If no data needs to be transmitted, the first indication information and the second indication information may not be sent. Similarly, the network device may first send the third indication information, and then send the fourth indication information when the data is transmitted between the first terminal device and the second terminal device. If no data needs to be transmitted, the fourth indication information may not be sent. Alternatively, the network device may first send the fourth indication information, and then send the third indication information when the data is transmitted between the first terminal device and the second terminal device. If no data needs to be transmitted, the third indication information may not be sent.

In a possible implementation, before that the first terminal device receives fourth indication information from the network device, the method further includes: The first terminal device sends, to the network device, first communication quality of a downlink data channel between the network device, the electromagnetic hypersurface array antenna, and the first terminal device, where the first communication quality is used to determine the second transmission resource. The network device may select, based on the communication quality, a transmission resource with minimum interference for the data transmission between the two terminal devices.

In a possible implementation, that the first terminal device obtains second to-be-coded data from the second terminal device based on the third to-be-coded data and the first network coded data includes: The first terminal device performs an exclusive OR operation on the third to-be-coded data and the first network coded data to obtain the second to-be-coded data. A receive end may obtain, by performing the exclusive OR operation, to-be-coded data sent by a transmit end, which is simple and efficient.

According to a second aspect, a network coding method is provided, and it includes: A network device sends first indication information to a first terminal device; or the network device sends third indication information to the first terminal device and a second terminal device, where the third indication information indicates the first terminal device to negotiate a first transmission resource of the first indication information or second indication information with the second terminal device. The first indication information indicates to preprocess a phase of first to-be-coded data to be sent by the first terminal device, and the second indication information indicates not to preprocess a phase of second to-be-coded data to be sent by the second terminal device; or the first indication information indicates not to preprocess a phase of first to-be-coded data to be sent by the first terminal device, and the second indication information indicates to preprocess a phase of second to-be-coded data to be sent by the second terminal device.

In the network coding method provided in this embodiment of this application, the network device indicates either of two terminal devices that communicate through an electromagnetic hypersurface array antenna to preprocess the phase of the to-be-sent to-be-coded data. Alternatively, the network device indicates the transmission resource negotiated by the two terminal devices, and the two terminal devices negotiate to determine either of the two terminal devices to preprocess the phase of the to-be-sent to-be-coded data, and implement time-domain network coding and distribution on the electromagnetic hypersurface array antenna, that is, perform time domain superposition and reflection on a signal. Data sending, network coding, and receiving are completed in the same slot. This improves efficiency of indirect data transmission between the two terminal devices.

In a possible implementation, for that a network device sends first indication information to a first terminal device, the method includes: The network device sends the second indication information to the second terminal device. Only either of the two may be performed: The network device sends the first indication information to the first terminal device, and the network device sends the second indication information to the second terminal device. For example, only that the network device sends the first indication information to the first terminal device is performed, or only that the network device sends the second indication information to the second terminal device is performed. If the first terminal device does not receive the first indication information from the network device, the first terminal device determines that the first indication information indicates not to preprocess the phase of the first to-be-coded data to be sent by the first terminal device. If the second terminal device does not receive the second indication information from the network device, the second terminal device determines that the second indication information indicates not to preprocess the phase of the second to-be-coded data to be sent by the second terminal device.

In a possible implementation, the method further includes: The network device sends fourth indication information to the first terminal device and the second terminal device, where the fourth indication information indicates a second transmission resource that carries data transmitted between the first terminal device and the second terminal device through an electromagnetic hypersurface array antenna. The network device may first send the first indication information and the second indication information, and then send the fourth indication information when the data is transmitted between the first terminal device and the second terminal device. If no data needs to be transmitted, the fourth indication information may not be sent. Alternatively, the network device may first send the fourth indication information, and then send the first indication information and the second indication information when the data is transmitted between the first terminal device and the second terminal device. If no data needs to be transmitted, the first indication information and the second indication information may not be sent. Similarly, the network device may first send the third indication information, and then send the fourth indication information when the data is transmitted between the first terminal device and the second terminal device. If no data needs to be transmitted, the fourth indication information may not be sent. Alternatively, the network device may first send the fourth indication information, and then send the third indication information when the data is transmitted between the first terminal device and the second terminal device. If no data needs to be transmitted, the third indication information may not be sent.

In a possible implementation, the method further includes: The network device obtains first communication quality of a data channel between the electromagnetic hypersurface array antenna and the first terminal device, and second communication quality of a data channel between the electromagnetic hypersurface array antenna and the second terminal device. The network device may select, based on the first communication quality and the second communication quality, a transmission resource with minimum interference for the data transmission between the two terminal devices.

In a possible implementation, that the network device obtains first communication quality of a data channel between the electromagnetic hypersurface array antenna and the first terminal device, and second communication quality of a data channel between the electromagnetic hypersurface array antenna and the second terminal device includes: The network device obtains first communication quality of an uplink data channel between the electromagnetic hypersurface array antenna and the first terminal device from the electromagnetic hypersurface array antenna; and the network device obtains second communication quality of an uplink data channel between the electromagnetic hypersurface array antenna and the second terminal device from the electromagnetic hypersurface array antenna. When an active component is mounted on the electromagnetic hypersurface array antenna, the electromagnetic hypersurface array antenna may measure communication quality of the uplink data channel between the electromagnetic hypersurface array antenna and the first terminal device by using at least one antenna unit, to obtain the first communication quality. The electromagnetic hypersurface array antenna may further measure communication quality of the uplink data channel between the electromagnetic hypersurface array antenna and the second terminal device by using the at least one antenna unit, to obtain the second communication quality.

In a possible implementation, that the network device obtains first communication quality of a data channel between the electromagnetic hypersurface array antenna and the first terminal device, and second communication quality of a data channel between the electromagnetic hypersurface array antenna and the second terminal device includes: The network device obtains first communication quality of a downlink data channel between the network device, the electromagnetic hypersurface array antenna, and the first terminal device from the first terminal device; and the network device obtains second communication quality of a downlink data channel between the network device, the electromagnetic hypersurface array antenna, and the second terminal device from the second terminal device. This implementation may be applied to a scenario in which no active component is mounted on the electromagnetic hypersurface array antenna.

In a possible implementation, the network device sends a configuration parameter to the electromagnetic hypersurface array antenna based on the first communication quality and the second communication quality, where the configuration parameter is used to adjust a phase of each antenna unit in the electromagnetic hypersurface array antenna. A network coding function may be implemented by configuring the phase, for example, a phase distribution or a phase gradient, of the electromagnetic hypersurface array antenna.

In a possible implementation, that the network device sends fourth indication information to the first terminal device and the second terminal device includes: The network device sends the fourth indication information to the first terminal device and the second terminal device based on the first communication quality and the second communication quality. The network device may select, based on the first communication quality and the second communication quality, a transmission resource with minimum interference for the data transmission between the two terminal devices.

In a possible implementation, the first communication quality and the second communication quality are further used to determine the second transmission resource for the data transmission between the first terminal device and the second device.

In a possible implementation, before that a network device sends first indication information to a first terminal device, and sends the second indication information to the second terminal device, the method further includes: The network device receives first information from the first terminal device, where the first information includes at least one of: first request information, an interference level of the first terminal device, and a processing capability of the first terminal device, where the first request information is used to request whether to preprocess the phase of the first to-be-coded data; the network device receives second information from the second terminal device, where the second information includes at least one of: second request information, an interference level of the second terminal device, and a processing capability of the second terminal device, where the second request information is used to request whether to preprocess the phase of the second to-be-coded data; and the network device determines the first indication information and the second indication information based on the first information and the second information. The interference level of the terminal device includes self-interference between a transmit antenna and a receive antenna of the terminal device, interference from another terminal device to the terminal device, or a sum of the foregoing two types of interference. The processing capability of the terminal device is a capability of the terminal device to preprocess the phase of the to-be-coded data. The network device may select a terminal device with a low interference level and a strong processing capability to preprocess the phase of the to-be-coded data. Alternatively, the terminal device actively requests to preprocess the phase of the to-be-coded data.

According to a third aspect, a communication apparatus is provided, and it includes: a processing module, configured to determine first indication information, where the first indication information indicates whether to preprocess a phase of first to-be-coded data to be sent by the communication apparatus; and that data is transmitted between the communication apparatus and a second terminal device in a same slot of a same transmission resource through an electromagnetic hypersurface array antenna includes: a transceiver module, configured to: send third to-be-coded data to the electromagnetic hypersurface array antenna in a first slot of a second transmission resource, and receive first network coded data from the electromagnetic hypersurface array antenna in the first slot, where the third to-be-coded data is obtained based on the first indication information and the first to-be-coded data; and a processing module, configured to obtain second to-be-coded data from the second terminal device based on the third to-be-coded data and the first network coded data.

In a possible implementation, the transceiver module is further configured to receive the first indication information from a network device.

In a possible implementation, before receiving the first indication information from the network device, the transceiver module is further configured to send first information to the network device, where the first information includes at least one of: first request information, an interference level of the communication apparatus, and a processing capability of the communication apparatus, where the first request information is used to request whether to preprocess the phase of the first to-be-coded data, and the first information is used to determine the first indication information.

In a possible implementation, the transceiver module is further configured to receive third indication information from a network device, where the third indication information indicates the communication apparatus to negotiate a first transmission resource of the first indication information with the second terminal device. The data is transmitted between the communication apparatus and the second terminal device in the same slot of the same transmission resource through the electromagnetic hypersurface array antenna. The processing module is further configured to determine the first indication information based on a result of the negotiation with the second terminal device on the first transmission resource.

In a possible implementation, the transceiver module is further configured to receive fourth indication information from the network device, where the fourth indication information indicates the second transmission resource that carries the data transmitted between the communication apparatus and the second terminal device through the electromagnetic hypersurface array antenna.

In a possible implementation, before receiving the fourth indication information from the network device, the transceiver module is further configured to send first communication quality of a downlink data channel between the network device, the electromagnetic hypersurface array antenna, and the communication apparatus to the network device, where the first communication quality is used to determine the second transmission resource.

In a possible implementation, the processing module is further configured to perform an exclusive OR operation on the third to-be-coded data and the first network coded data to obtain the second to-be-coded data.

According to a fourth aspect, a communication apparatus is provided, and it includes: a transceiver module, configured to send first indication information to a first terminal device; or the transceiver module, configured to send third indication information to the first terminal device and a second terminal device, where the third indication information indicates the first terminal device to negotiate a first transmission resource of the first indication information or second indication information with the second terminal device. The first indication information indicates to preprocess a phase of first to-be-coded data to be sent by the first terminal device, and the second indication information indicates not to preprocess a phase of second to-be-coded data to be sent by the second terminal device; or the first indication information indicates not to preprocess a phase of first to-be-coded data to be sent by the first terminal device, and the second indication information indicates to preprocess a phase of second to-be-coded data to be sent by the second terminal device.

In a possible implementation, for sending the first indication information to the first terminal device, the transceiver module is further configured to send the second indication information to the second terminal device.

In a possible implementation, the transceiver module is further configured to send fourth indication information to the first terminal device and the second terminal device, where the fourth indication information indicates a second transmission resource that carries data transmitted between the first terminal device and the second terminal device through an electromagnetic hypersurface array antenna.

In a possible implementation, the transceiver module is further configured to obtain first communication quality of a data channel between the electromagnetic hypersurface array antenna and the first terminal device, and second communication quality of a data channel between the electromagnetic hypersurface array antenna and the second terminal device.

In a possible implementation, the transceiver module is further configured to: obtain first communication quality of an uplink data channel between the electromagnetic hypersurface array antenna and the first terminal device from the electromagnetic hypersurface array antenna; and obtain second communication quality of an uplink data channel between the electromagnetic hypersurface array antenna and the second terminal device from the electromagnetic hypersurface array antenna.

In a possible implementation, the transceiver module is further configured to: obtain first communication quality of a downlink data channel between the communication apparatus, the electromagnetic hypersurface array antenna, and the first terminal device from the first terminal device; and obtain second communication quality of a downlink data channel between the communication apparatus, the electromagnetic hypersurface array antenna, and the second terminal device from the second terminal device.

In a possible implementation, the transceiver module is further configured to send a configuration parameter to the electromagnetic hypersurface array antenna based on the first communication quality and the second communication quality, where the configuration parameter is used to adjust a phase of each antenna unit in the electromagnetic hypersurface array antenna. In a possible implementation, a processing module is further included. Before the transceiver module sends the first indication information to the first terminal device, the transceiver module is further configured to receive first information from the first terminal device, where the first information includes at least one of: first request information, an interference level of the first terminal device, and a processing capability of the first terminal device, where the first request information is used to request whether to preprocess the phase of the first to-be-coded data. The transceiver module is further configured to receive second information from the second terminal device, where the second information includes at least one of: second request information, an interference level of the second terminal device, and a processing capability of the second terminal device, where the second request information is used to request whether to preprocess the phase of the second to-be-coded data. The processing module is configured to determine the first indication information and the second indication information based on the first information and the second information.

According to a fifth aspect, a communication apparatus is provided, and it includes a processor, where the processor is coupled to a memory, the memory is configured to store a computer program, and the processor is configured to execute the computer program stored in the memory, to enable the communication apparatus to perform the method according to any one of the first aspect and the implementations of the first aspect.

According to a sixth aspect, a communication apparatus is provided, including a processor, where the processor is coupled to a memory, the memory is configured to store a computer program, and the processor is configured to execute the computer program stored in the memory, to enable the communication apparatus to perform the method according to any one of the second aspect and the implementations of the second aspect.

According to a seventh aspect, a computer-readable storage medium is provided, where the computer-readable storage medium stores a computer program, and when the computer program is run on a computer, the method according to any one of the first aspect and the implementations of the first aspect is performed.

According to an eighth aspect, a computer-readable storage medium is provided, where the computer-readable storage medium stores a computer program, and when the computer program is run on a computer, the method according to any one of the second aspect and the implementations of the second aspect is performed.

According to a ninth aspect, a computer program product including instructions is provided, where when the instructions are run on a computer or a processor, the method according to any one of the first aspect and the implementations of the first aspect is performed.

According to a tenth aspect, a computer program product including instructions is provided, where when the instructions are run on a computer or a processor, the method according to any one of the second aspect and the implementations of the second aspect is performed.

According to an eleventh aspect, a communication system is provided, including the communication apparatus according to any one of the third aspect and the implementations of the third aspect, and the communication apparatus according to any one of the fourth aspect and the implementations of the fourth aspect; or including the communication apparatus according to the fifth aspect and the communication apparatus according to the sixth aspect.

For technical effects of the third aspect to the eleventh aspect, refer to the content of the first aspect to the second aspect. Details are not repeated herein.

BRIEF DESCRIPTION OF DRAWINGS

FIG. 4B-1 and FIG. 4B-2 are a schematic flowchart of another network coding method according to an embodiment of this application;

DESCRIPTION OF EMBODIMENTS

Terms such as “component”, “module”, and “system” used in this application indicate computer-related entities. The computer-related entities may be hardware, firmware, combinations of hardware and software, software, or software in running. For example, a component may be, but is not limited to, a process that is run on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and based on, for example, a signal having one or more data packets (for example, data from one component, where the component interacts with another component in a local system or a distributed system, and/or interacts with other systems via a network such as the Internet by using a signal).

In the specification and claims of this application, the terms “first”, “second”, and the like are intended to distinguish between different objects but do not indicate a particular order of the objects. For example, first indication information, second indication information, and the like are used to distinguish between different indication information but are not used to describe a particular order of the indication information.

Embodiments of this application may be applied to a time division duplex (TDD) scenario, and may also be applied to a frequency division duplex (FDD) scenario.

Embodiments of this application are described based on a scenario of a 5th generation (5G) network in a wireless communication network. It should be noted that the solutions in embodiments of this application may be further applied to another wireless communication network, for example, a new communication system such as a narrowband Internet of things (NB-IoT) system, a long term evolution (LTE) system, or 6G, and a corresponding name may be replaced with a name of a corresponding function in the another wireless communication network.

Figure 1:
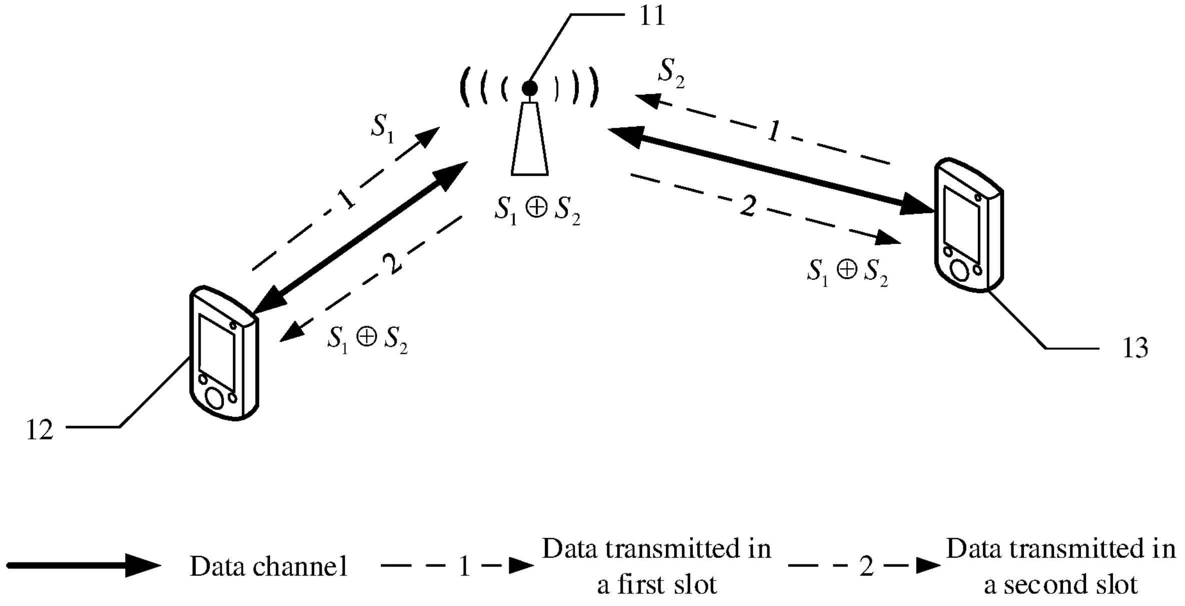
FIG. 1 is a schematic diagram of an architecture of a communication system according to an embodiment of this application.

As shown in FIG. 1, an embodiment of this application provides a communication system, including a relay station 11, a first terminal device 12, and a second terminal device 13.

The first terminal device 12 and the second terminal device 13 that perform indirect data transmission may transmit data by using the relay station 11. The relay station 11 performs network coding on the data from the first terminal device 12 and the second terminal device 13, and then sends coded data to the first terminal device 12 and the second terminal device 13. The data transmission and the network coding need to be completed by using two slots.

In a first slot, the first terminal device 12 and the second terminal device 13 send the data to the relay station 11 on a same transmission resource at the same time, the first terminal device 12 sends data $S_1$, and the second terminal device 13 sends data $S_2$. The relay station 11 performs network coding on the data S, and the data $S_2$ to obtain $S_1 \oplus S_2$, where $\oplus$ represents a logical exclusive OR operation between the data.

In a second slot, the relay station 11 sends data $S_1 \oplus S_2$ obtained through network coding to the first terminal device 12 and the second terminal device 13. The first terminal device 12 or the second terminal device 13 may obtain the data sent by the other party by performing an exclusive OR operation on the data sent by the first terminal device 12 or the second terminal device 13 and the data received by the first terminal device 12 or the second terminal device 13. For example, the first terminal device 12 may obtain the data $S_2$, that is, $S_1 \oplus (S_1+S_2)=S_2$, sent by the second terminal device 13 by performing an exclusive OR operation $S_1(S_1 \oplus S_2)$ on the data S sent by the first terminal device 12 and data $S_1 \oplus S_2$ received by the first terminal device 12. The second terminal device 13 may obtain the data $S_1$, that is, $S_2+(S_1 \oplus S_2)=S_1$, sent by the first terminal device 12 by performing an exclusive OR operation $S_2 \oplus (S_1 \oplus S_2)$ on the data $S_2$ sent by the second terminal device 13 and data $S_1 \oplus S_2$ received by the second terminal device 13.

Data exchange between the first terminal device 12 and the second terminal device 13 is completed by using the foregoing two slots. Data status transition corresponding to the foregoing network coding is shown in Table 1.

TABLE 1

| Sequence number | $S_1$ | $S_2$ | $S_1 \oplus S_2$ | $S_1 \oplus (S_1 \oplus S_2)$ | $S_2 \oplus (S_1 \oplus S_2)$ |
|---|---|---|---|---|---|
| 1 | 1 | 1 | 0 | 1 (=1 ⊕ 0) | 1 (=1 ⊕ 0) |
| 2 | 1 | 0 | 1 | 0 (=1 ⊕ 1) | 1 (=0 ⊕ 1) |
| 3 | 0 | 1 | 1 | 1 (=0 ⊕ 1) | 0 (=1 ⊕ 1) |
| 4 | 0 | 0 | 0 | 0 (=0 ⊕ 0) | 0 (=0 ⊕ 0) |

In the foregoing network coding method, the relay station 11 needs to receive and demodulate, in the first slot in frequency domain, the data from the two terminal devices, and perform network coding. In the second slot, the relay station 11 shifts the data obtained through network coding from frequency domain to time domain, and then sends the data to the two terminal devices. An algorithm implementation of the relay station 11 is complex.

The relay station 11 needs to implement a complex communication protocol, and an active component is mounted. Therefore, power consumption is high, a requirement for energy supply is high, and costs are high.

The data transmission for a single time between the two terminal devices still needs to be completed by using the two slots, and transmission efficiency still needs to be improved.

Figure 2:
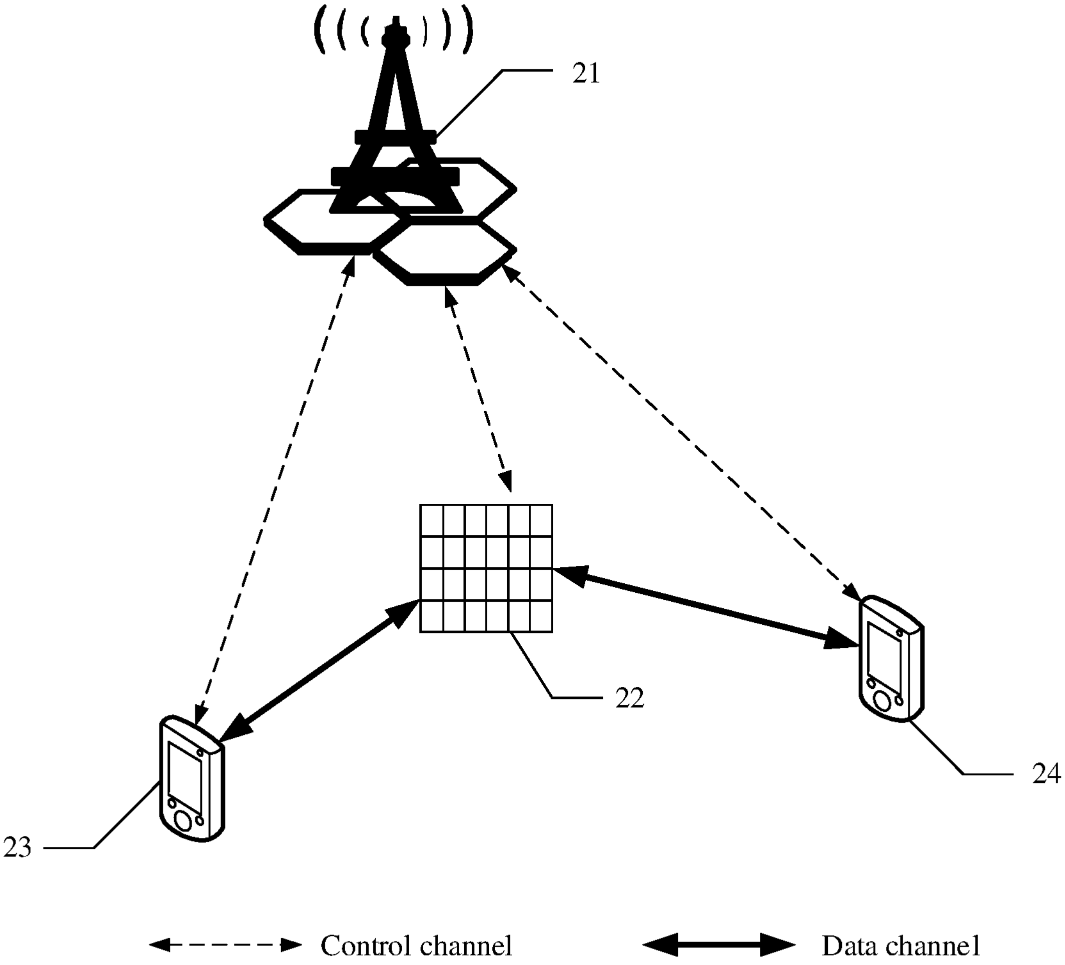
FIG. 2 is a schematic diagram of an architecture of another communication system according to an embodiment of this application.

An embodiment of this application provides another communication system, which is also applicable to indirect data transmission between two terminal devices. As shown in FIG. 2, the communication system includes a network device 21, an electromagnetic hypersurface array antenna 22, a first terminal device 23, and a second terminal device 24.

Within coverage of the network device 21, data is transmitted between the first terminal device 23 and the second terminal device 24 through the electromagnetic hypersurface array antenna 22. A data channel exists between the first terminal device 23 and the electromagnetic hypersurface array antenna 22, and a data channel exists between the second terminal device 24 and the electromagnetic hypersurface array antenna 22.

The network device 21 configures a resource and a transmission mode for data transmission between the first terminal device 23 and the second terminal device 24, and the network device 21 further controls a working mode of the electromagnetic hypersurface array antenna used in the data transmission. A control channel exists between the network device 21 and the first terminal device 23, a control channel exists between the network device 21 and the second terminal device 24, and a control channel exists between the network device 21 and the electromagnetic hypersurface array antenna 22.

The terminal device in embodiments of this application is also referred to as user equipment (UE), a mobile station (MS), a mobile terminal (MT), or the like, and is a device that provides voice and/or data connectivity for a user, for example, a handheld device, a vehicle-mounted device, or the like that has a wireless connection function. Currently, some examples of terminal devices include a mobile phone, a tablet computer, a notebook computer, a palmtop computer, a mobile Internet device (MID), a wearable device, a virtual reality (VR) device, an augmented reality (AR) device, a wireless terminal in industrial control (industrial control), a wireless terminal in self-driving, a wireless terminal in remote medical surgery, a wireless terminal in a smart grid, a wireless terminal in transportation safety, a wireless terminal in a smart city, or a wireless terminal in a smart home.

The network device in embodiments of this application is a radio access network (RAN) node (or device) that connects a terminal device to a wireless network, and may also be referred to as a base station. Currently, examples of some RAN nodes include a next generation NodeB (gNB) in a 5G system, an evolved NodeB (eNB or eNodeB) in an LTE system, a transmission reception point (TRP), a radio network controller (RNC), a NodeB (Node B, NB), a base station controller (BSC), a base transceiver station (BTS), a home base station (HNB), a baseband unit (BBU), a wireless fidelity (Wi-Fi) access point (AP), or the like. In addition, in a network structure, the network device may include a centralized unit (CU), a distributed unit (DU), or a RAN device including a CU and a DU. The RAN device including a CU and a DU splits protocol layers from a perspective of logical functions. Some functions of the protocol layers are centrally controlled by the CU; and some or all remaining functions of the protocol layers are distributed in the DU, and the CU centrally controls the DU.

The electromagnetic hypersurface array antenna in embodiments of this application is made of an artificial composite material, and includes a plurality of antenna units of subwavelength sizes. The antenna units interact with electromagnetic waves in a specific manner, have unique electromagnetic properties different from antenna units made of natural materials, and can generate unconventional physical phenomena such as negative refraction, perfect lens, and electromagnetic stealth. An active component may be mounted on or may not be mounted on the electromagnetic hypersurface array antenna. When the active component is mounted, the electromagnetic hypersurface array antenna may measure communication quality of an uplink data channel between the electromagnetic hypersurface array antenna and a terminal device. If the active component is not mounted, the electromagnetic hypersurface array antenna is equivalent to an omnidirectional reflection antenna.

Figure 3:
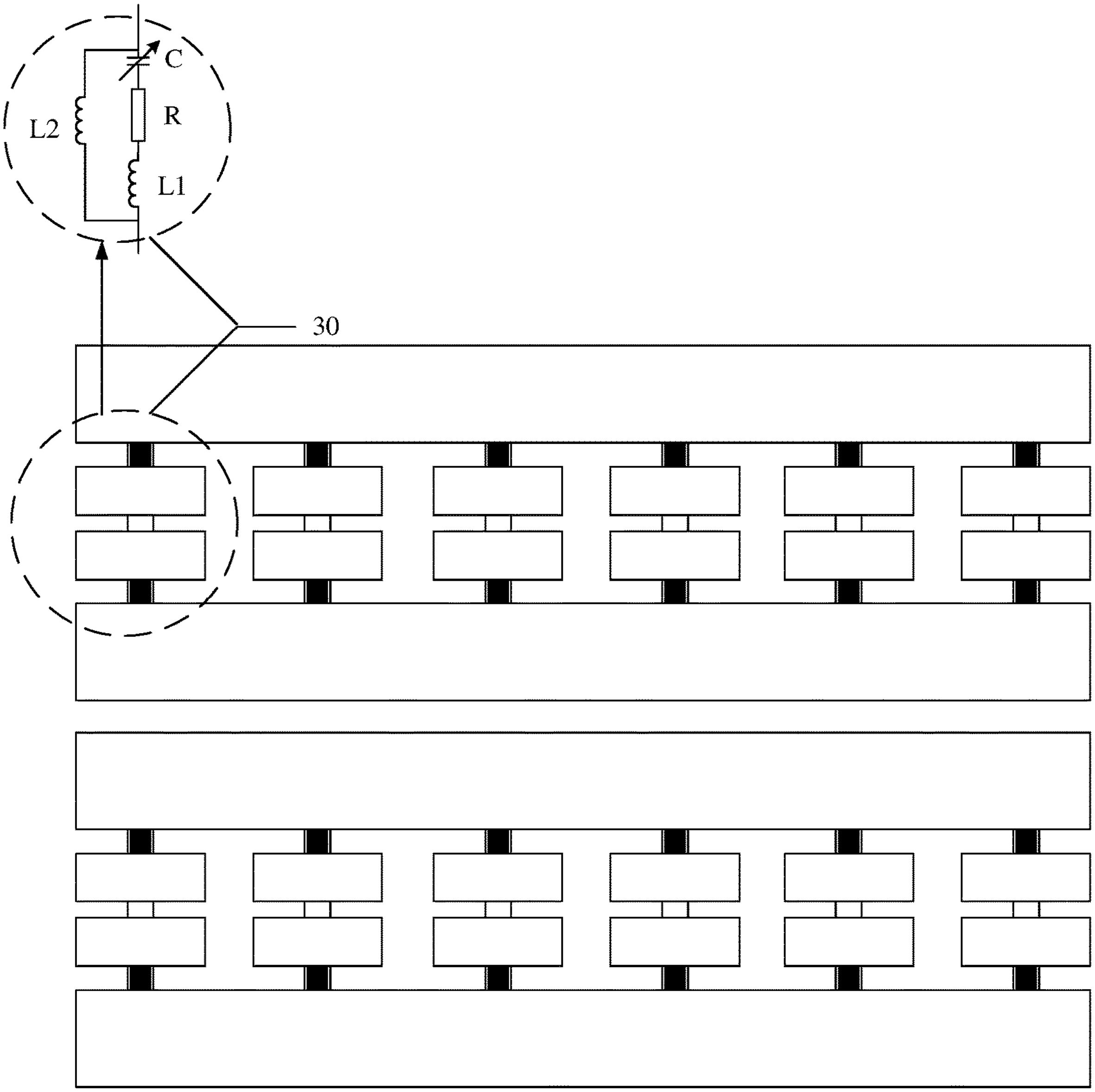
FIG. 3 is a schematic diagram of a structure of an electromagnetic hypersurface array antenna according to an embodiment of this application.

For example, as shown in FIG. 3, each antenna unit 30 may have a specific circuit structure, for example, equivalent to a varactor circuit. The varactor circuit includes a variable capacitor C, a resistor R, an inductor L1, and an inductor L2. The variable capacitor C, the resistor R, and the inductor L1 are connected in series and then connected in parallel to the inductor L2.

The antenna units may generate resonance at a specific frequency, so that properties of the electromagnetic waves change. Antenna units made of different metamaterials are combined in various manners. In this way, multifunctional regulation and control of the electromagnetic waves can be implemented, and the electromagnetic hypersurface array antenna obtains a discretization property of a digital domain.

A digital programmable electromagnetic characteristic enables the electromagnetic hypersurface array antenna to dynamically change electromagnetic parameters, for example, an amplitude and phase information of a reflection coefficient or a transmission coefficient, of the antenna units under control of a program (for example, changing a capacitance value of the variable capacitor C in FIG. 3), to implement modulation of electromagnetic wave parameters of various functions in a coding manner.

Based on the communication system shown in FIG. 2, an embodiment of this application provides a network coding method. Either of two terminal devices that communicate through an electromagnetic hypersurface array antenna preprocesses a phase of to-be-sent to-be-coded data without changing energy of the to-be-coded data, to implement time-domain network coding and distribution on the electromagnetic hypersurface array antenna. This improves coding efficiency. Because network coding and distribution are performed by using a reflection principle of the electromagnetic hypersurface array antenna, a structure is simple, there are fewer active components, energy consumption is low, dependence on external energy is low, and costs are low. Therefore, the electromagnetic hypersurface array antenna can be applicable to a more complex communication scenario. In addition, data sending, network coding, and receiving are completed in a same slot, data between two users is exchanged in real time, and transmission efficiency is high.

Figure 4A:
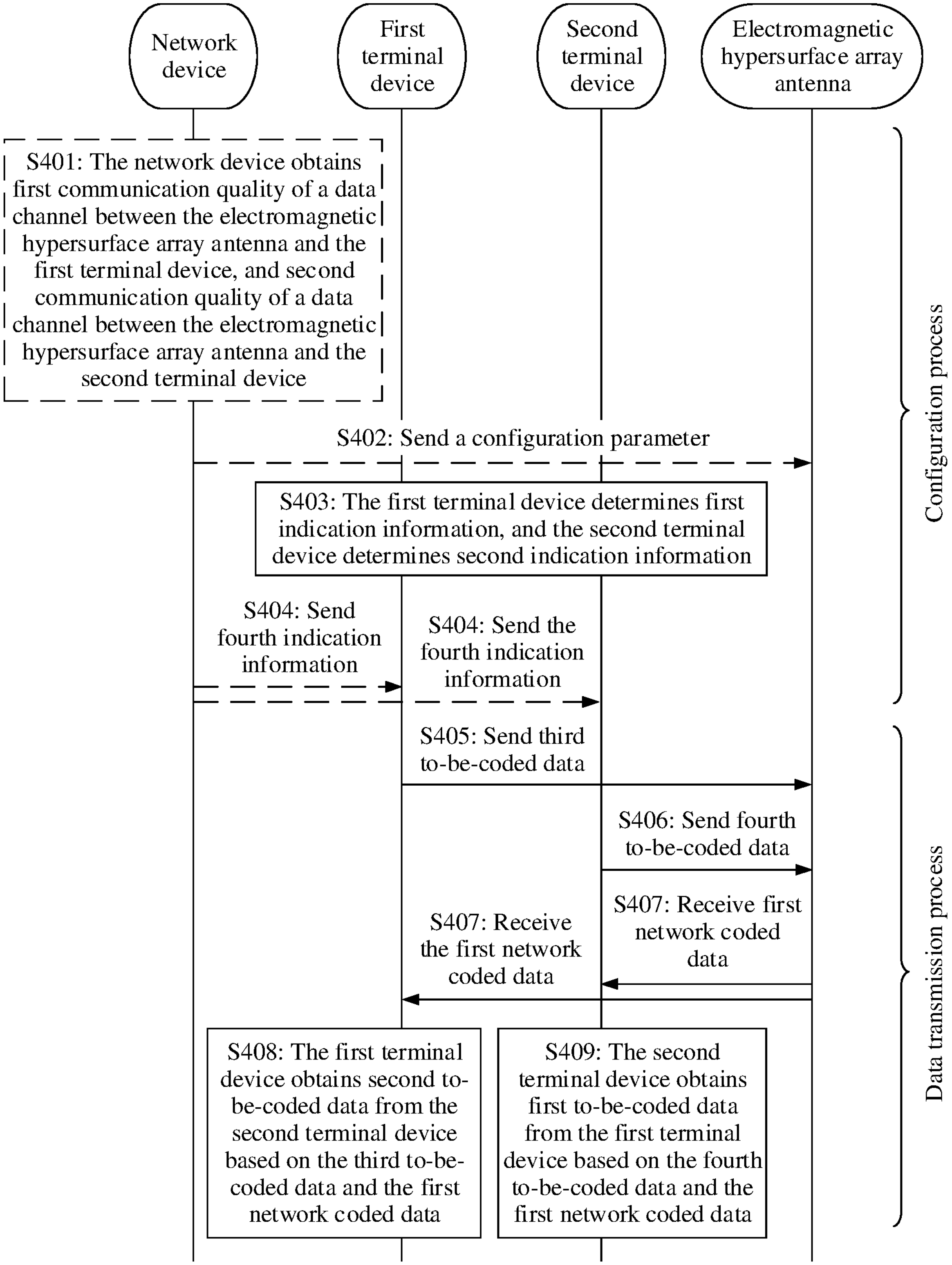
FIG. 4A is a schematic flowchart of a network coding method according to an embodiment of this application.
Figures 1, 4B:
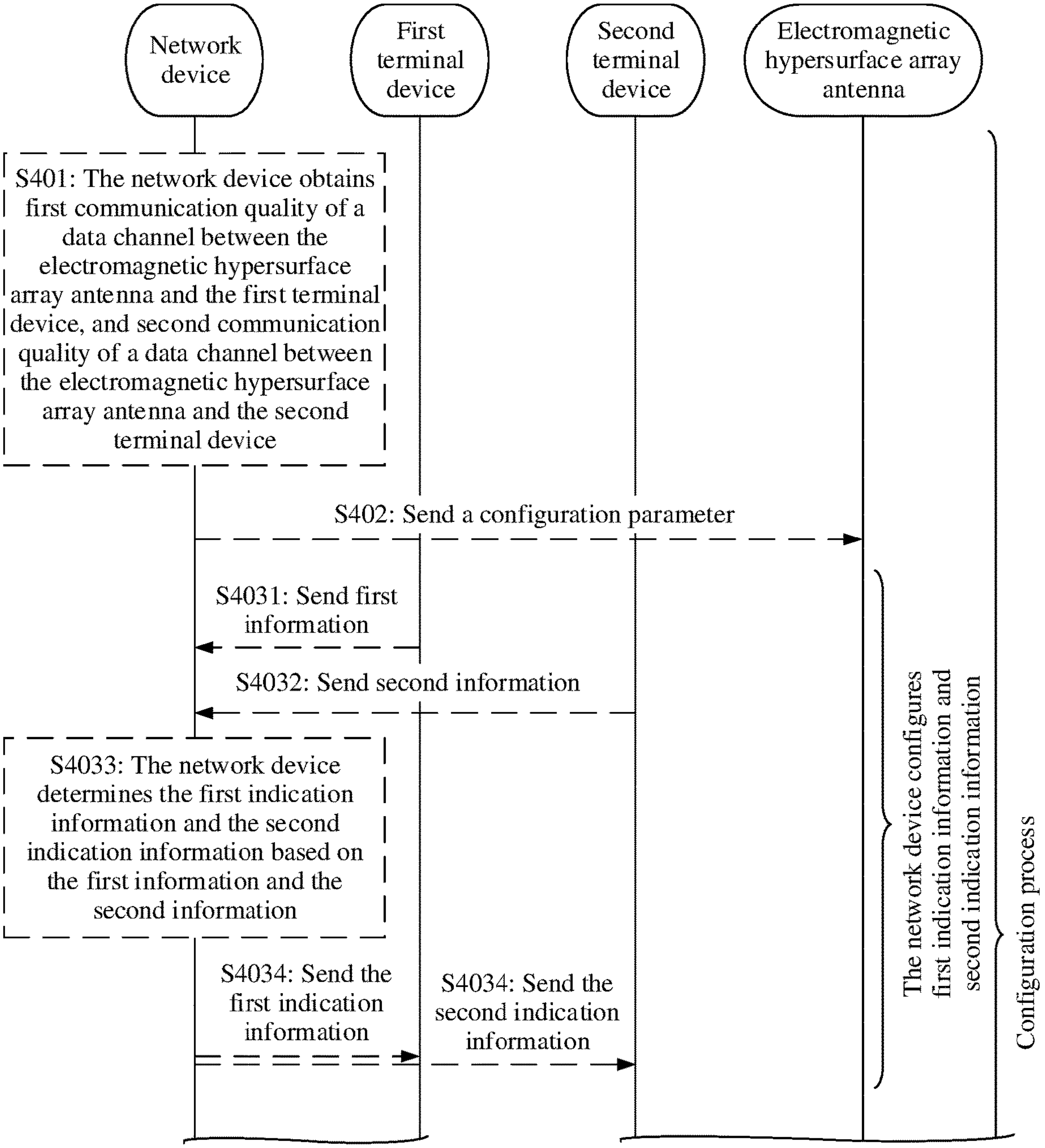
Figures 2, 4B:
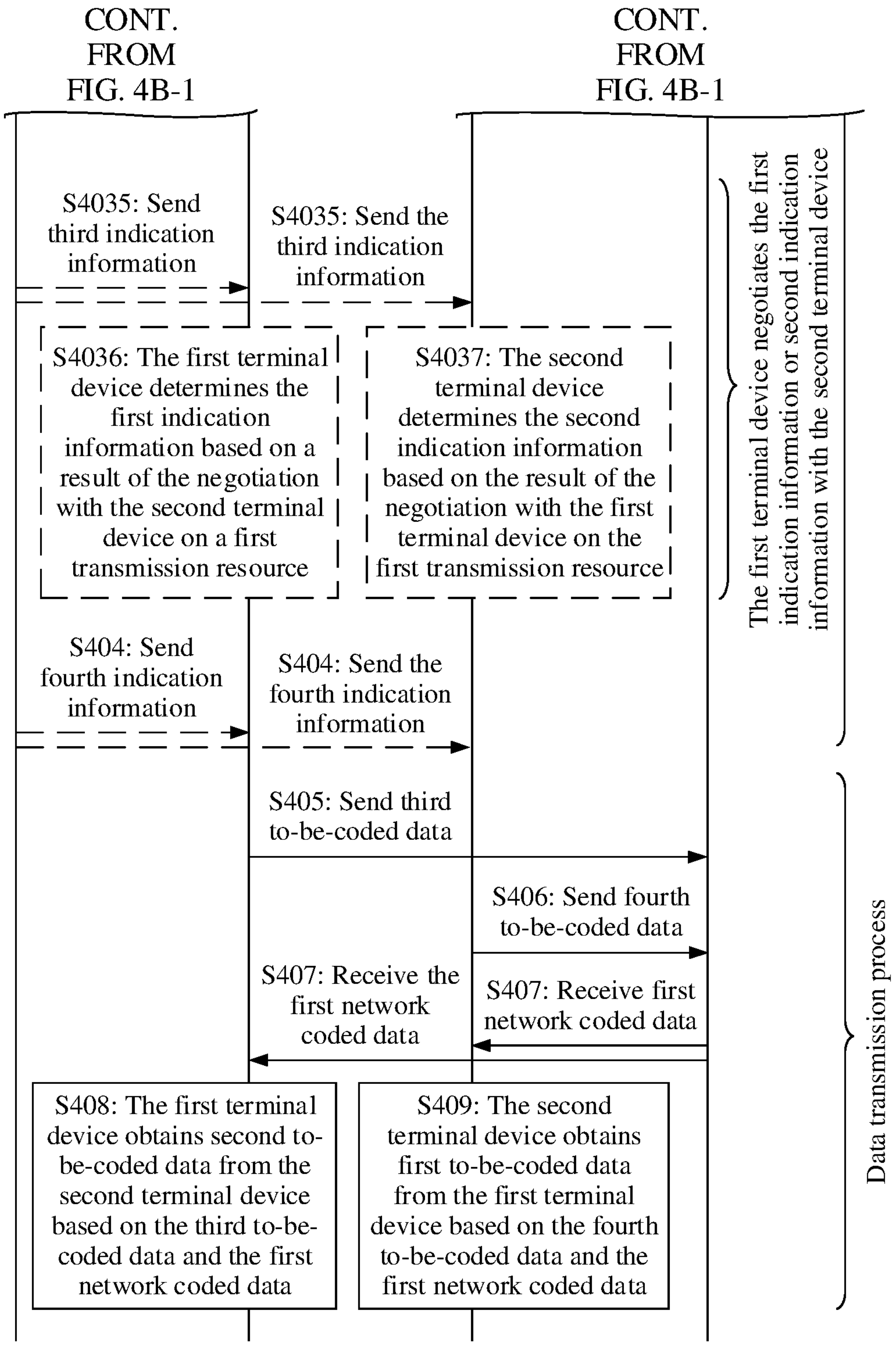

Specifically, as shown in FIG. 4A, an embodiment of this application provides a network coding method, including S401 to S409. As shown in FIG. 4B-1 and FIG. 4B-2, step S403 includes S4031 to S4037. Either S4031 to S4034 or S4035 to S4037 are performed, that is, S4031 to S4034 may be performed. In this case, a network device configures first indication information and second indication information. Alternatively, S4035 to S4037 are performed. In this case, two terminal devices that communicate with each other negotiate the first indication information and the second indication information.

S401: The network device obtains first communication quality of a data channel between an electromagnetic hypersurface array antenna and a first terminal device, and second communication quality of a data channel between the electromagnetic hypersurface array antenna and a second terminal device.

Communication quality in embodiments of this application may include a channel gain, a received signal-to-noise ratio, and the like.

Data is transmitted between the first terminal device and the second terminal device in a same slot of a same transmission resource through the electromagnetic hypersurface array antenna. In a possible implementation, if an active component is mounted on the electromagnetic hypersurface array antenna, the electromagnetic hypersurface array antenna may measure communication quality of an uplink data channel between the electromagnetic hypersurface array antenna and the first terminal device by using at least one antenna unit, to obtain first communication quality. The electromagnetic hypersurface array antenna sends the first communication quality of the uplink data channel between the electromagnetic hypersurface array antenna and the first terminal device to the network device. Correspondingly, the network device obtains the first communication quality of the uplink data channel between the electromagnetic hypersurface array antenna and the first terminal device from the electromagnetic hypersurface array antenna.

Similarly, if the active component is mounted on the electromagnetic hypersurface array antenna, the electromagnetic hypersurface array antenna may further measure communication quality of an uplink data channel between the electromagnetic hypersurface array antenna and the second terminal device by using the at least one antenna unit, to obtain second communication quality. The electromagnetic hypersurface array antenna sends the second communication quality of the uplink data channel between the electromagnetic hypersurface array antenna and the second terminal device to the network device. Correspondingly, the network device obtains the second communication quality of the uplink data channel between the electromagnetic hypersurface array antenna and the second terminal device from the electromagnetic hypersurface array antenna.

In another possible implementation, the first terminal device may measure a downlink data channel between the network device, the electromagnetic hypersurface array antenna, and the first terminal device, to obtain first communication quality. The first terminal device sends the first communication quality of the downlink data channel between the network device, the electromagnetic hypersurface array antenna, and the first terminal device to the network device. Correspondingly, the network device obtains the first communication quality of the downlink data channel between the network device, the electromagnetic hypersurface array antenna, and the first terminal device from the first terminal device.

Similarly, the second terminal device may measure a downlink data channel between the network device, the electromagnetic hypersurface array antenna, and the second terminal device, to obtain second communication quality. The second terminal device sends the second communication quality of the downlink data channel between the network device, the electromagnetic hypersurface array antenna, and the second terminal device to the network device. Correspondingly, the network device obtains the second communication quality of the downlink data channel between the network device, the electromagnetic hypersurface array antenna, and the second terminal device from the second terminal device.

Step S401 is optional, and may be periodically performed, or may be performed before the first terminal device communicates with the second terminal device.

S402: The network device sends a configuration parameter to the electromagnetic hypersurface array antenna based on the first communication quality and the second communication quality.

The configuration parameter is used to adjust a phase of each antenna unit in the electromagnetic hypersurface array antenna.

In a possible implementation, the configuration parameter may include a phase value of at least one antenna unit, and the electromagnetic hypersurface array antenna adjusts a phase of a corresponding antenna unit based on the configuration parameter. In this way, the phase of each antenna unit can be precisely controlled.

In another possible implementation, the network device and the electromagnetic hypersurface array antenna store a same index table, different index values in the index table correspond to different phase matrices, and each phase value in the phase matrix corresponds to a phase of one antenna unit of the electromagnetic hypersurface array antenna. The configuration parameter may include an index value in the index table. The electromagnetic hypersurface array antenna searches for a corresponding phase matrix based on the index value, and adjusts phases of all antenna units based on the phase matrix. In this way, the phases of all the antenna units of the entire electromagnetic hypersurface array antenna can be quickly adjusted.

Figure 5:
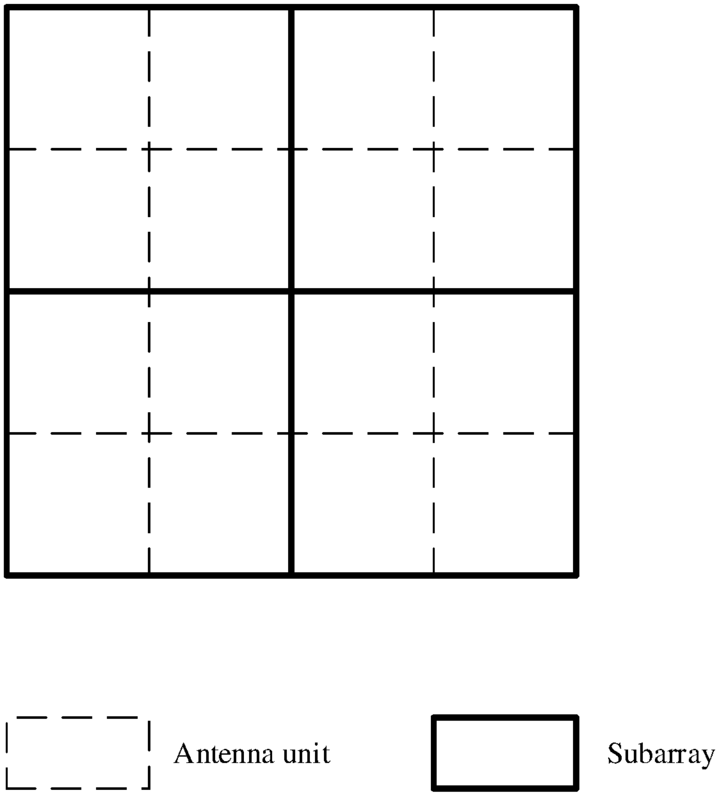
FIG. 5 is a schematic diagram of a structure of another electromagnetic hypersurface array antenna according to an embodiment of this application.

As shown in FIG. 5, the electromagnetic hypersurface array antenna may include N subarrays, and each subarray may provide services for different terminal devices. An $n^{th}$ ($1 \le n \le N$) subarray includes $K_n$ antenna units, and quantities of antenna units included in the subarrays may be the same or different. Each antenna unit can independently control a phase and an amplitude of an incident electromagnetic wave. A reflection coefficient of an antenna unit $k_A$ is $$A_{k_n} e^{j\varphi_{k_n}},$$

where $A_{k_a}$ is an amplitude of the reflection coefficient, and $\varphi_{k_A}$ is a phase of the reflection coefficient. In this case, a reflected signal of the electromagnetic hypersurface array antenna may be represented as:

$$R = \left(\sum_{k=1}^{K} A_k e^{j\varphi_k}\right)(S_1 + S_2^*) = \underbrace{\left(\sum_{n=1}^{N} \underbrace{\sum_{k=1}^{K_n} A_k e^{j\varphi_k}}_{C_n}\right)}_{C}(S_1 \oplus S_2). \quad \text{formula (1)}$$

$C_n$ represents an equivalent aperture of the $n^{th}$ subarray, and C represents an equivalent aperture of the electromagnetic hypersurface array antenna. A resolution of the subarray or the electromagnetic hypersurface array antenna is equal to a reciprocal of the equivalent aperture. A larger equivalent aperture indicates a higher angular resolution and a higher antenna gain. By configuring these parameters, the electromagnetic hypersurface array antenna can provide optimal coverage for different transmission environments. By controlling the equivalent aperture C, a slot and a frequency for data exchange between terminal devices can be controlled, to align received data and sent data in the slot. A network coding function may be implemented by configuring the phase, for example, a phase distribution or a phase gradient, of the electromagnetic hypersurface array antenna. The phase distribution may include a Gaussian phase distribution, and is used to implement omnidirectional radiation. The phase gradient refers to a phase difference between adjacent antenna units.

Step S402 is optional, and may be performed after step S401, or may be performed before the first terminal device communicates with the second terminal device.

S403: The first terminal device determines the first indication information, and the second terminal device determines the second indication information.

In a possible implementation, the network device may configure the first indication information and the second indication information. In this case, as shown in FIG. 4B-1 and FIG. 4B-2, step S403 includes steps S4031 to S4034.

In another possible implementation, the first terminal device and the second terminal device that communicate with each other negotiate the first indication information and the second indication information. In this case, as shown in FIG. 4B-1 and FIG. 4B-2, step S403 includes steps S4035 to S4037.

S4031: The first terminal device sends first information to the network device.

Correspondingly, the network device receives the first information from the first terminal device. The first information includes at least one of: first request information, an interference level of the first terminal device, and a processing capability of the first terminal device. The first request information is used to request whether to preprocess a phase of first to-be-coded data to be sent by the first terminal device.

The interference level of the terminal device includes self-interference between a transmit antenna and a receive antenna of the terminal device, interference from another terminal device to the terminal device, or a sum of the foregoing two types of interference. For the self-interference between the transmit antenna and the receive antenna, the terminal device may measure a mutual interference level (namely, the self-interference) between the transmit antenna and the receive antenna during simultaneous transmission and reception. In a possible implementation, if a self-interference level between the transmit antenna and the receive antenna of the terminal device can be queried in a factory parameter table, the self-interference level of the terminal device may be directly sent to the network device without measurement.

The processing capability of the terminal device is a capability of the terminal device to preprocess the phase of the to-be-coded data. Possibly, the network device may indicate the terminal device to solve a complex mathematical proposition. For example, the network device dynamically configures an initialization parameter for the terminal device. The terminal device generates a group of data based on the initialization parameter to solve a predefined equation (or equation set), or the terminal device performs CRC check on a sequence based on the initialization parameter. The terminal device sends time used for calculation to the network device, that is, reports the processing capability of the terminal device.

A range of preprocessing the phase of the to-be-coded data in this embodiment of this application is $[\pi-\alpha, \pi+\beta]$, where $0<\alpha, \beta \le \pi/4$. That is, a phase of an analog signal of the to-be-coded data is shifted by a specific angle, and the angle belongs to $[\pi-\alpha, \pi+\beta]$. For example, when $\alpha=\beta=0$, preprocessing the phase of the to-be-coded data refers to negating the phase of the to-be-coded data.

It should be noted that the range $[\pi-\alpha, \pi+]$ of preprocessing the phase of the to-be-coded data may include $\alpha=\beta=\pi/4$, or may not include $\alpha=\beta=\pi/4$.

The following describes in detail preprocessing a phase of to-be-coded data to be sent by either of the two terminal devices.

Step S4031 is optional, and may be performed when the first terminal device is initially accessed. Because communication quality of the first terminal device changes, step S4031 may alternatively be performed before the first terminal device communicates with the second terminal device.

S4032: The second terminal device sends second information to the network device.

Correspondingly, the network device receives the second information from the second terminal device. The second information includes at least one of: second request information, an interference level of the second terminal device, and a processing capability of the second terminal device. The second request information is used to request whether to preprocess a phase of second to-be-coded data to be sent by the second terminal device.

A specific manner in which the first information or the second information is named is not limited in this application.

Step S4032 is optional, and may be performed when the second terminal device is initially accessed. Because communication quality of the second terminal device changes, step S4032 may alternatively be performed before the second terminal device communicates with the first terminal device.

Step S4031 and step S4032 are not subject to a specific sequence.

S4033: The network device determines the first indication information and the second indication information based on the first information and the second information.

The first indication information indicates to preprocess the phase of the first to-be-coded data to be sent by the first terminal device, and the second indication information indicates not to preprocess the phase of the second to-be-coded data to be sent by the second terminal device. Alternatively, the first indication information indicates not to preprocess the phase of the first to-be-coded data to be sent by the first terminal device, and the second indication information indicates to preprocess the phase of the second to-be-coded data to be sent by the second terminal device.

In other words, the network device indicates either of the first terminal device or the second terminal device to preprocess the phase of the to-be-sent to-be-coded data, and the other terminal device not to preprocess the phase of the to-be-sent to-be-coded data.

For example, it is assumed that the first request information requests to preprocess the phase of the first to-be-coded data, and the second request information requests not to preprocess the phase of the second to-be-coded data. The first indication information indicates to preprocess the phase of the first to-be-coded data to be sent by the first terminal device, and the second indication information indicates not to preprocess the phase of the second to-be-coded data to be sent by the second terminal device.

It is assumed that the first request information requests not to preprocess the phase of the first to-be-coded data, and the second request information requests to preprocess the phase of the second to-be-coded data. The first indication information indicates not to preprocess the phase of the first to-be-coded data to be sent by the first terminal device, and the second indication information indicates to preprocess the phase of the second to-be-coded data to be sent by the second terminal device.

It is assumed that the first request information requests to preprocess the phase of the first to-be-coded data, and the second request information requests to preprocess the phase of the second to-be-coded data. The network device determines the first indication information and the second indication information, for example, randomly selects either of the first terminal device or the second terminal device to process the phase of the to-be-coded data. In this case, the first indication information indicates not to preprocess the phase of the first to-be-coded data to be sent by the first terminal device, and the second indication information indicates to preprocess the phase of the second to-be-coded data to be sent by the second terminal device; or the first indication information indicates to preprocess the phase of the first to-be-coded data to be sent by the first terminal device, and the second indication information indicates not to preprocess the phase of the second to-be-coded data to be sent by the second terminal device.

For example, it is assumed that the interference level of the first terminal device is lower than the interference level of the second terminal device. The first indication information indicates to preprocess the phase of the first to-be-coded data to be sent by the first terminal device, and the second indication information indicates not to preprocess the phase of the second to-be-coded data to be sent by the second terminal device.

It is assumed that the interference level of the first terminal device is higher than the interference level of the second terminal device. The first indication information indicates not to preprocess the phase of the first to-be-coded data to be sent by the first terminal device, and the second indication information indicates to preprocess the phase of the second to-be-coded data to be sent by the second terminal device.

It is assumed that the interference level of the first terminal device is the same as the interference level of the second terminal device. The network device determines the first indication information and the second indication information, for example, randomly selects either of the first terminal device or the second terminal device to process the phase of the to-be-coded data. In this case, the first indication information indicates not to preprocess the phase of the first to-be-coded data to be sent by the first terminal device, and the second indication information indicates to preprocess the phase of the second to-be-coded data to be sent by the second terminal device; or the first indication information indicates to preprocess the phase of the first to-be-coded data to be sent by the first terminal device, and the second indication information indicates not to preprocess the phase of the second to-be-coded data to be sent by the second terminal device.

For example, it is assumed that the processing capability of the first terminal device is higher than the processing capability of the second terminal device. The first indication information indicates to preprocess the phase of the first to-be-coded data to be sent by the first terminal device, and the second indication information indicates not to preprocess the phase of the second to-be-coded data to be sent by the second terminal device.

It is assumed that the processing capability of the first terminal device is lower than the processing capability of the second terminal device. The first indication information indicates not to preprocess the phase of the first to-be-coded data to be sent by the first terminal device, and the second indication information indicates to preprocess the phase of the second to-be-coded data to be sent by the second terminal device.

It is assumed that the processing capability of the first terminal device is the same as the processing capability of the second terminal device. The network device determines the first indication information and the second indication information, for example, randomly selects either of the first terminal device or the second terminal device to process the phase of the to-be-coded data. In this case, the second indication information indicates to preprocess the phase of the second to-be-coded data to be sent by the second terminal device; or the first indication information indicates to preprocess the phase of the first to-be-coded data to be sent by the first terminal device, and the second indication information indicates not to preprocess the phase of the second to-be-coded data to be sent by the second terminal device.

For example, it is assumed that the first request information requests to preprocess the phase of the first to-be-coded data, and the second request information requests to preprocess the phase of the second to-be-coded data. The network device may further determine the first indication information and the second indication information in the foregoing manner based on interference levels or processing capabilities of the two terminal devices.

It should be noted that the request information, the interference level, and the processing capability from the terminal device may have priorities. The network device may determine the first indication information and the second indication information based on a priority of information of a same type in the first information or the second information.

For example, it is assumed that the interference level of the first terminal device is higher than the interference level of the second terminal device, and the processing capability of the first terminal device is higher than the processing capability of the second terminal device. If the priority of the interference level is higher than the priority of the processing capability, the first indication information indicates not to preprocess the phase of the first to-be-coded data to be sent by the first terminal device, and the second indication information indicates to preprocess the phase of the second to-be-coded data to be sent by the second terminal device.

Step S4033 is optional, and may be performed after step S4031 and step S4032, or may be performed before the first terminal device communicates with the second terminal device.

S4034: The network device sends the first indication information to the first terminal device, and sends the second indication information to the second terminal device. Correspondingly, the first terminal device receives the first indication information from the network device, and the second terminal device receives the second indication information from the network device.

For different values of $\alpha$ and $\beta$ when the phase is preprocessed, the first indication information or the second indication information occupies different bits.

If $\alpha=\beta=0$, the first indication information or the second indication information may occupy one bit. For example, when a value of the first indication information is 1, it indicates that the phase of the first to-be-coded data to be sent by the first terminal device is preprocessed; and when the value is 0, it indicates that the phase of the first to-be-coded data to be sent by the first terminal device is not preprocessed. When a value of the second indication information is 1, it indicates that the phase of the second to-be-coded data to be sent by the second terminal device is preprocessed; and when the value is 0, it indicates that the phase of the second to-be-coded data to be sent by the second terminal device is not preprocessed.

If $\alpha$ and $\beta$ are not 0, $\alpha$ and $\beta$ may be predefined discrete value pairs, and the first indication information or the second indication information may occupy a plurality of bits.

It should be noted that only either of the two may be performed: The network device sends the first indication information to the first terminal device, and the network device sends the second indication information to the second terminal device. For example, only that the network device sends the first indication information to the first terminal device is performed, or only that the network device sends the second indication information to the second terminal device is performed.

If the first terminal device does not receive the first indication information from the network device, the first terminal device determines that the first indication information indicates not to preprocess the phase of the first to-be-coded data to be sent by the first terminal device. If the second terminal device does not receive the second indication information from the network device, the second terminal device determines that the second indication information indicates not to preprocess the phase of the second to-be-coded data to be sent by the second terminal device.

The first terminal device and the second terminal device may separately send the indication information to the network device, to indicate that the negotiation between the first terminal device and the second terminal device fails. Alternatively, the first terminal device and the second terminal device may subsequently negotiate on a first transmission resource.

S4035: The network device sends third indication information to the first terminal device and the second terminal device.

Correspondingly, the first terminal device and the second terminal device receive the third indication information from the network device.

The third indication information indicates the first terminal device to negotiate the first transmission resource of the first indication information or second indication information with the second terminal device.

S4036: The first terminal device determines the first indication information based on a result of the negotiation with the second terminal device on the first transmission resource.

The first terminal device and the second terminal device may negotiate the first indication information or the second indication information on the first transmission resource through signaling interaction.

For example, the first terminal device requests, on the first transmission resource, the second terminal device to preprocess the phase of the first to-be-coded data to be sent by the first terminal device. The second terminal device requests, on the first transmission resource, the first terminal device not to preprocess the phase of the second to-be-coded data to be sent by the second terminal device. The first terminal device may determine that the first indication information indicates to preprocess the phase of the first to-be-coded data to be sent by the first terminal device, and follow the result of the negotiation in a subsequent data transmission process.

S4037: The second terminal device determines the second indication information based on the result of the negotiation with the first terminal device on the first transmission resource.

The example in step S4036 is continued. The second terminal device may determine that the second indication information indicates not to preprocess the phase of the second to-be-coded data to be sent by the second terminal device, and follow the result of the negotiation in the subsequent data transmission process.

Step S4036 and step S4037 are not subject to a specific sequence. In a possible implementation, step S4036 and step S4037 may be performed at the same time.

It should be noted that, if the first terminal device does not obtain the result through negotiation with the second terminal device on the first transmission resource (step S4036 is unsuccessful or is not performed), in a possible implementation, the first terminal device determines that the first indication information indicates not to preprocess the phase of the first to-be-coded data to be sent by the first terminal device.

Similarly, if the second terminal device does not obtain the result through negotiation with the first terminal device on the first transmission resource (step S4037 is unsuccessful or is not performed), it is determined that the second indication information indicates not to preprocess the phase of the second to-be-coded data to be sent by the second terminal device.

In a possible implementation, when the first terminal device and the second terminal device do not obtain the result of the negotiation, the first terminal device and the second terminal device may separately send the indication information to the network device, to indicate that the negotiation between the first terminal device and the second terminal device fails. Alternatively, the first terminal device and the second terminal device renegotiate on the first transmission resource.

S404: The network device sends fourth indication information to the first terminal device and the second terminal device.

Correspondingly, the first terminal device and the second terminal device receive the fourth indication information from the network device.

The fourth indication information indicates a second transmission resource that carries data transmitted between the first terminal device and the second terminal device through the electromagnetic hypersurface array antenna.

If the second transmission resource is far greater than the first transmission resource, a manner, described in steps S4035 to S4037, in which the first indication information and the second indication information are negotiated between the terminal devices does not significantly reduce transmission efficiency.

Specifically, the network device may send the fourth indication information to the first terminal device and the second terminal device based on the first communication quality and the second communication quality. For example, a transmission resource with small interference to both the first terminal device and the second terminal device may be selected as the second transmission resource.

It should be noted that step S404 is optional, step S404 and steps S4031 to S4034 are not subject to a specific sequence, and step S404 and steps S4035 to S4037 are not subject to a specific sequence. Alternatively, step S404 may be performed before the first terminal device communicates with the second terminal device.

For example, the network device may first send the first indication information and the second indication information, and then send the fourth indication information when the data is transmitted between the first terminal device and the second terminal device. If no data needs to be transmitted, the fourth indication information may not be sent. Alternatively, the network device may first send the fourth indication information, and then send the first indication information and the second indication information when the data is transmitted between the first terminal device and the second terminal device. If no data needs to be transmitted, the first indication information and the second indication information may not be sent.

Similarly, the network device may first send the third indication information, and then send the fourth indication information when the data is transmitted between the first terminal device and the second terminal device. If no data needs to be transmitted, the fourth indication information may not be sent. Alternatively, the network device may first send the fourth indication information, and then send the third indication information when the data is transmitted between the first terminal device and the second terminal device. If no data needs to be transmitted, the third indication information may not be sent.

The first indication information and the fourth indication information may be transmitted in one configuration message, or may be transmitted in different configuration messages. For example, the first indication information (or the second indication information) may be transmitted in downlink control information (DCI), and the fourth indication information may be transmitted in another type of message, for example, a radio resource control (RRC) message or a media access control control element (MAC CE) message. Similarly, the second indication information and the fourth indication information may be transmitted in one configuration message, or may be transmitted in different configuration messages. The third indication information and the fourth indication information may be transmitted in one configuration message, or may be transmitted in different configuration messages.

A form of a message carrying the indication information is not limited in this application. For example, the message may be the DCI, the RRC message, or the MAC CE message.

S405: The first terminal device sends third to-be-coded data to the electromagnetic hypersurface array antenna in a first slot of the second transmission resource.

The third to-be-coded data is obtained based on the first indication information and the first to-be-coded data.

Figure 6:
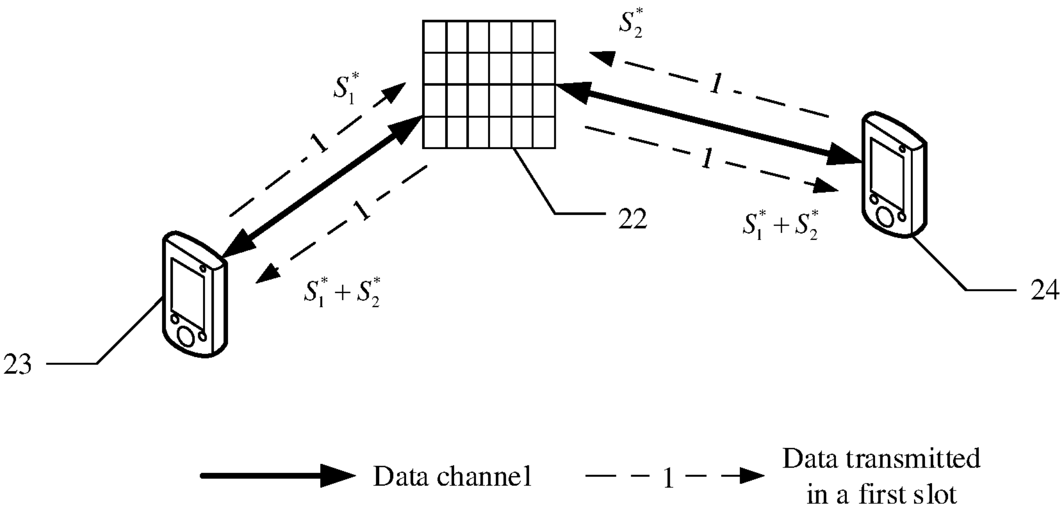
FIG. 6 is a schematic diagram of communication between two terminal devices through an electromagnetic hypersurface array antenna according to an embodiment of this application.

For example, as shown in FIG. 6, it is assumed that the first to-be-coded data to be sent by the first terminal device 23 is S1, and the first indication information indicates not to preprocess the phase of the first to-be-coded data S1 to be sent by the first terminal device. The third to-be-coded data $$S_1^*$$

sent by the first terminal device is the same as the first to-be-coded data $S_1$, that is, $$S_1^* = S_1.$$

S406: The second terminal device sends fourth to-be-coded data to the electromagnetic hypersurface array antenna in the first slot of the second transmission resource.

The fourth to-be-coded data is obtained based on the second indication information and the second to-be-coded data.

For example, as shown in FIG. 6, it is assumed that the second to-be-coded data to be sent by the second terminal device 24 is $S_2$, and the second indication information indicates to preprocess the phase of the second to-be-coded data $S_2$ to be sent by the second terminal device. The fourth to-be-coded data $$S_2^*$$

sent by the second terminal device is to-be-coded data obtained after the phase of the second to-be-coded data $S_2$ is preprocessed.

S407: The first terminal device and the second terminal device receive first network coded data from the electromagnetic hypersurface array antenna in the first slot.

For example, as shown in FIG. 6, the first terminal device 23 and the second terminal device 24 send the to-be-coded data to the electromagnetic hypersurface array antenna 22 in a same slot (the first slot) of a same transmission resource (the second transmission resource). The two pieces of to-be-coded data arrive at the electromagnetic hypersurface array antenna 22 at the same time, and network coding (time domain superposition) is performed in time domain, to obtain the first network coded data $$S_1^* + S_2^*.$$

The electromagnetic hypersurface array antenna 22 does not need to actively process the to-be-coded data or the network coded data, that is, may directly reflect the first network coded data $$S_1^* + S_2^*$$

obtained through network coding to the first terminal device 23 and the second terminal device 24 in the first slot.

S408: The first terminal device obtains the second to-be-coded data from the second terminal device based on the third to-be-coded data and the first network coded data.

The first terminal device performs an exclusive OR operation on the third to-be-coded data $$S_1^*(S_1)$$

sent by the first terminal device and the first network coded data $$S_1^* + S_2^*$$

received by the first terminal device, to obtain the fourth to-be-coded data $$S_2^*$$

from the second terminal device, that is, $$S_1^* \oplus (S_1^* + S_2^*) = S_2^*.$$

A principle of obtaining a corresponding digital signal based on a received analog signal by the terminal device is: The terminal device performs integration on energy of the received analog signal to obtain an integral value, and then compares the integral value with a threshold. If the integral value is greater than the threshold, the corresponding digital signal is 1. Otherwise, the corresponding digital signal is 0.

Because the phase of the to-be-coded data is preprocessed, energy of an analog signal of the to-be-coded data is not changed. Therefore, an energy integral of an analog signal of the fourth to-be-coded data $$S_2^*$$

is the same as an energy integral of an analog signal of the second to-be-coded data $S_2$, and identified corresponding digital signals are the same. Therefore, obtaining the fourth to-be-coded data $$S_2^*$$

is equivalent to obtaining the second to-be-coded data $S_2$.

S409: The second terminal device obtains the first to-be-coded data from the first terminal device based on the fourth to-be-coded data and the first network coded data.

The second terminal device performs the exclusive OR operation on the fourth to-be-coded data $$S_2^*$$

sent by the second terminal device and the first network coded data $$S_1 + S_2^*$$

received by the second terminal device, to obtain the third to-be-coded data $S_1'$ from the first terminal device, that is, $$S_2^* \oplus (S_1^* + S_2^*) = S_1^*.$$

Similarly, the analog signal of the fourth to-be-coded data $$S_2^*$$

is the same as a digital signal corresponding to the second to-be-coded data $S_2$.

Therefore, obtaining the third to-be-coded data $$S_1^*$$

is equivalent to obtaining the first to-be-coded data $S_1$.

Figure 7A:
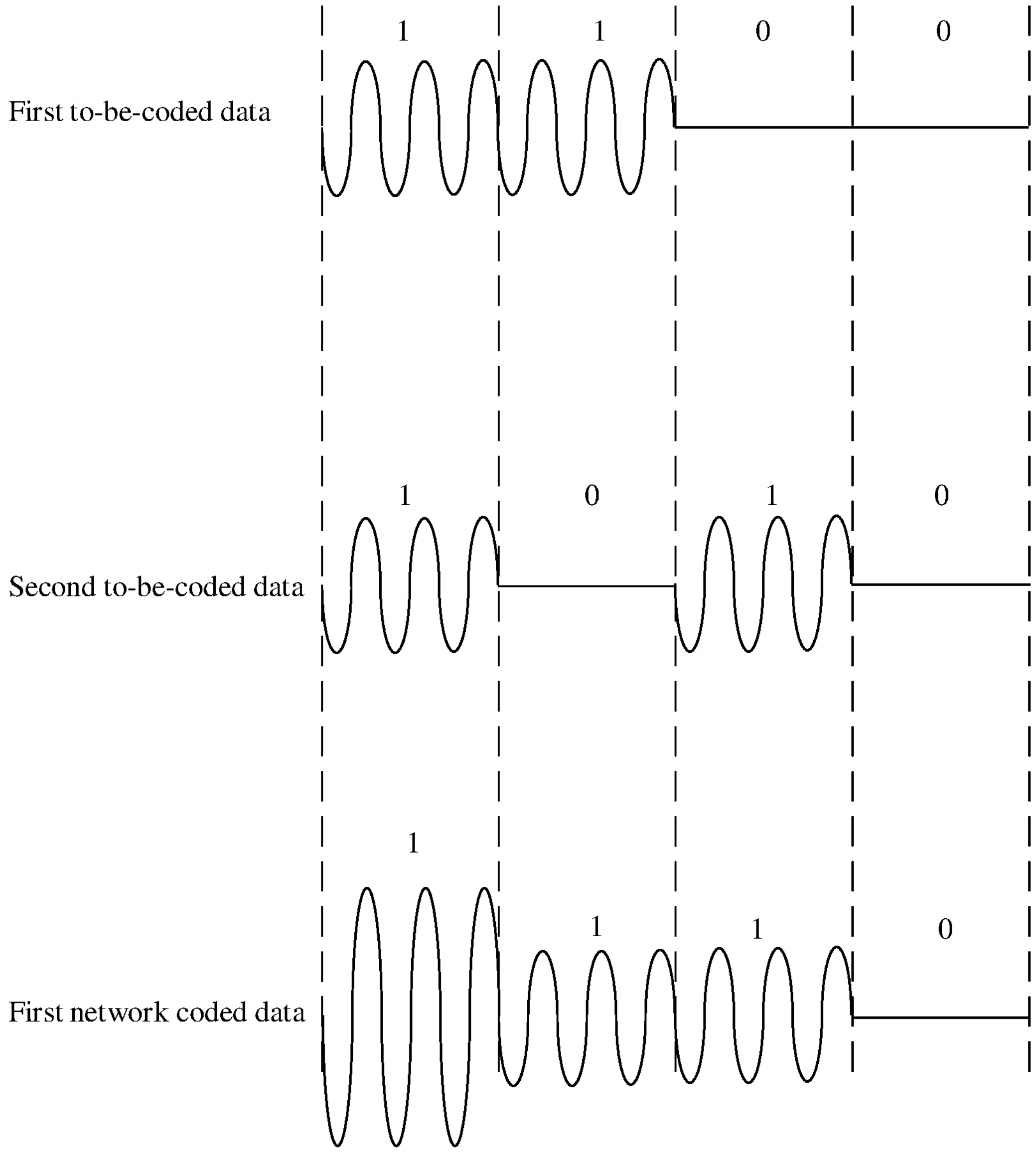
FIG. 7A is a schematic diagram in which preprocessing is not performed according to an embodiment of this application.

As shown in FIG. 7A, if a phase of first network coded data $S_1$ and a phase of second network coded data $S_2$ are not preprocessed, when time domain superposition is performed on the first network coded data and the second network coded data at the electromagnetic hypersurface array antenna to obtain $S_1+S_2$, obtained first network coded data is still "1" because analog signals corresponding to two "1s" are greater than the threshold after the time domain superposition is performed on energy. Data status transition corresponding to the foregoing network coding is shown in Table 2.

TABLE 2

| Sequence number | $S_1$ | $S_2$ | $S_1 + S_2$ | $S_1 \oplus (S_1 + S_2)$ | $S_2 \oplus (S_1 + S_2)$ |
|---|---|---|---|---|---|
| 1 | 1 | 1 | 1 | 0 (=1 ⊕ 1) | 0 (=1 ⊕ 1) |
| 2 | 1 | 0 | 1 | 0 (=1 ⊕ 1) | 1 (=0 ⊕ 1) |
| 3 | 0 | 1 | 1 | 1 (=0 ⊕ 1) | 0 (=1 ⊕ 1) |
| 4 | 0 | 0 | 0 | 0 (=0 ⊕ 0) | 0 (=0 ⊕ 0) |

For the row corresponding to the sequence number 1, the first terminal device and the second terminal device still perform the exclusive OR operation on the sent to-be-coded data and the received network coded data, and both the first terminal device and the second terminal device incorrectly identify the to-be-coded data "1" sent by the other party as "0".

However, if the phase of the to-be-coded data to be sent by either of the terminal devices is preprocessed, phases of the analog signals corresponding to the two "1s" are shifted, and the energy can be canceled when the time domain superposition is performed. A cancellation effect is related to a shifting angle of the phase when the phase is preprocessed. When shifting angles of the phases of the analog signals corresponding to the two "1s" are closer to TT, it indicates a more obvious cancellation effect, and energy obtained after the time domain superposition is performed is more likely to be less than the threshold, that is, more likely to be identified as "0". When the shifting angle is π, that is, the phase of to-be-coded data to be sent by either of the terminal devices is negated, the energy obtained after the time domain superposition is performed is zero. In this case, a probability of misjudgment is the lowest.

Figure 7B:
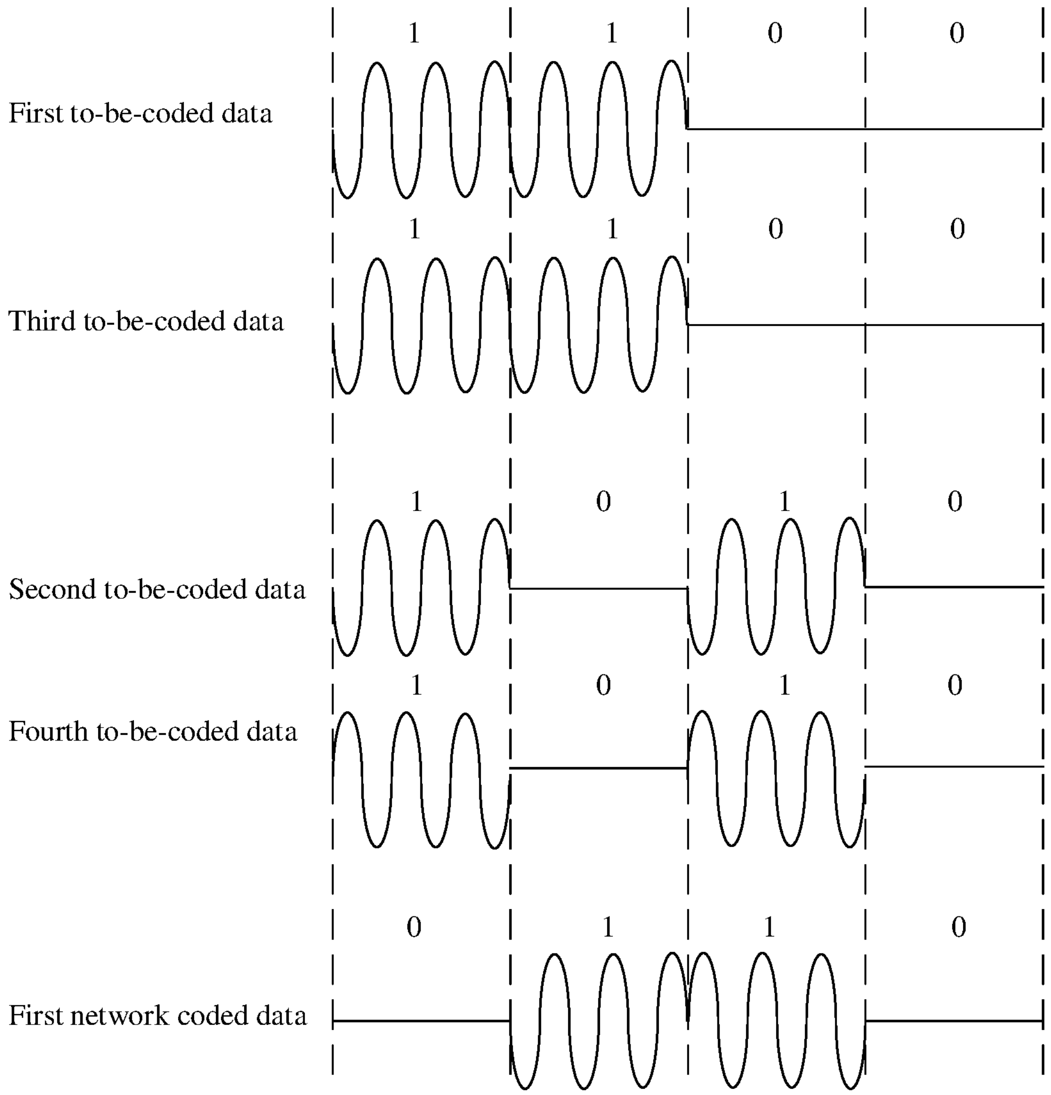
FIG. 7B is a schematic diagram in which preprocessing refers to phase reversal according to an embodiment of this application.

For example, as shown in FIG. 7B, it is assumed that the phase of the second to-be-coded data $S_2$ to be sent by the second terminal device is negated to obtain the fourth to-be-coded data $$S_2^* = -S_2,$$

and the phase of the first to-be-coded data S, to be sent by the first terminal device is not negated to obtain the third to-be-coded data $$S_1^* = S_1.$$

The time domain superposition is performed on the third to-be-coded data and the fourth to-be-coded data at the electromagnetic hypersurface array antenna to obtain the first network coded data $S_1$-$S_2$. Because energy of the analog signals corresponding to the two "1s" is the same and the phases are opposite, the energy obtained after the time domain superposition is performed is zero and is less than the threshold, and the obtained first network coded data is "0".

Data status transition corresponding to the foregoing network coding is shown in Table 3.

TABLE 3

| Sequence number | $S_1$ | $S_2$ | $S_1 - S_2$ | $S_1 \oplus (S_1 - S_2)$ | $S_2 \oplus (S_1 - S_2)$ |
|---|---|---|---|---|---|
| 1 | 1 | 1 | 0 | 1 (=1 ⊕ 0) | 1 (=1 ⊕ 0) |
| 2 | 1 | 0 | 1 | 0 (=1 ⊕ 1) | 1 (=0 ⊕ 1) |
| 3 | 0 | 1 | −1 (an energy integral is equal to 1) | 1 (=0 ⊕ 1) | 0 (=1 ⊕ 1) |
| 4 | 0 | 0 | 0 | 0 (=0 ⊕ 0) | 0 (=0 ⊕ 0) |

It can be learned from the foregoing implementations that the data exchange between the first terminal device and the second terminal device is completed by using only one slot. Compared with two slots, the transmission efficiency is higher.

For newly paired first terminal device and second terminal device, the network device needs to perform steps S402, S4033, S4034, S4035, and S404 again. For a first terminal device and a second terminal device that are not newly paired, each time data is transmitted between the first terminal device and the second terminal device, the two terminal devices may directly perform steps S405 to S409.

It should be noted that, in the foregoing embodiment, it is assumed that the self-interference level between the transmit antenna and the receive antenna of the terminal device is very low. However, in an actual application, there is a plurality of forms for the transmit antenna and the receive antenna of the terminal device. If the terminal device uses different directional antennas for sending and receiving, interference between the transmit antenna and the receive antenna is small, and the foregoing solution may be directly used. If the terminal device uses an omnidirectional antenna for sending and receiving, the terminal device first performs self-interference cancellation by using a serial interference cancellation (SIC) receiver at a receive end, and then demodulates received data. If a received signal strength needs to be improved, the network device may configure a beamforming command for the electromagnetic hypersurface array antenna, to form beams for directions of the two terminal devices, to send network coded data.

According to the network coding method provided in this embodiment, either of the two terminal devices preprocesses the phase of the to-be-coded data, sends the to-be-coded data to the electromagnetic hypersurface array antenna in the same slot of the same transmission resource, and implements time-domain network coding and distribution on the electromagnetic hypersurface array antenna, that is, performs time domain superposition and reflection on a signal. Data sending, network coding, and receiving are completed in the same slot. This improves efficiency of indirect data transmission between the two terminal devices.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component that can be used in the network device.

The foregoing mainly describes the solutions provided in embodiments of this application from a perspective of interaction between network elements. Correspondingly, an embodiment of this application further provides a communication apparatus. The communication apparatus is configured to implement the foregoing methods. The communication apparatus may be the terminal device in the foregoing method embodiments, an apparatus including the foregoing terminal device, or a chip or a function module in the terminal device. Alternatively, the communication apparatus may be the network device in the foregoing method embodiments, an apparatus including the foregoing network device, or a chip or a function module in the network device.

It may be understood that, to implement the foregoing functions, the communication apparatus includes hardware structures and/or software modules for performing corresponding functions. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiments. For example, functional modules may be obtained through division based on corresponding functions, or two or more functions may be integrated into one processing module. The integrated module may be implemented in a form of hardware, or may be implemented in a form of a software function module. It should be noted that, in embodiments of this application, the module division is used as an example, and is merely a logical function division. In an actual implementation, another division manner may be used.

Figure 8:
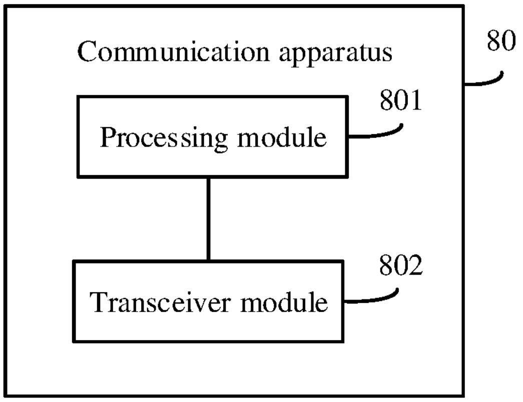
FIG. 8 is a first schematic diagram of a structure of a communication apparatus according to an embodiment of this application.

For example, an example in which the communication apparatus is the first terminal device or the second terminal device in the foregoing method embodiments is used. FIG. 8 is a schematic diagram of a structure of a communication apparatus 80. The communication apparatus 80 includes a processing module 801 and a transceiver module 802. The communication apparatus 80 may be the first terminal device or the second terminal device in FIG. 2. The processing module 801 may also be referred to as a processing unit, and is configured to implement a processing function of the first terminal device or the second terminal device in the foregoing method embodiments, for example, perform steps S403, S408, and S409 in FIG. 4A, or steps S4036, S4037, S408, and S409 in FIG. 4B-1 and FIG. 4B-2. The transceiver module 802 may also be referred to as a transceiver unit, and is configured to implement a transceiver function of the terminal device in the foregoing method embodiments, for example, perform steps S404, S405, S406, and S407 in FIG. 4A, or steps S4031, S4032, S4034, S4035, S404, S405, S406 and S407 in FIG. 4B-1 and FIG. 4B-2. The transceiver module 802 may be referred to as a transceiver circuit, a transceiver machine, a transceiver, or a communication interface.

For example, the processing module 801 is configured to determine first indication information, where the first indication information indicates whether to preprocess a phase of first to-be-coded data to be sent by the communication apparatus.

The communication apparatus 800 transmits data to the second terminal device in a same slot of a same transmission resource through an electromagnetic hypersurface array antenna, where the transmitting includes:

The transceiver module 802 is configured to: send third to-be-coded data to the electromagnetic hypersurface array antenna in a first slot of a second transmission resource, and receive first network coded data from the electromagnetic hypersurface array antenna in the first slot, where the third to-be-coded data is obtained based on the first indication information and the first to-be-coded data; and the processing module 801 is configured to obtain second to-be-coded data from the second terminal device based on the third to-be-coded data and the first network coded data.

In a possible implementation, the transceiver module 802 is further configured to receive the first indication information from a network device.

In a possible implementation, the transceiver module 802 is configured to receive third indication information from the network device, where the third indication information indicates the communication apparatus to negotiate a first transmission resource of the first indication information with the second terminal device. The data is transmitted between the communication apparatus and the second terminal device in the same slot of the same transmission resource through the electromagnetic hypersurface array antenna. The processing module 801 is configured to determine the first indication information based on a result of the negotiation with the second terminal device on the first transmission resource.

In a possible implementation, the transceiver module 802 is further configured to receive fourth indication information from the network device, where the fourth indication information indicates the second transmission resource that carries the data transmitted between the communication apparatus and the second terminal device through the electromagnetic hypersurface array antenna.

In a possible implementation, the transceiver module 802 is further configured to: send the third to-be-coded data to the electromagnetic hypersurface array antenna in the first slot of the second transmission resource, and receive the first network coded data from the electromagnetic hypersurface array antenna in the first slot, where the third to-be-coded data is obtained based on the first indication information and the first to-be-coded data; and the processing module 801 is configured to obtain the second to-be-coded data from the second terminal device based on the third to-be-coded data and the first network coded data.

In a possible implementation, the processing module 801 is further configured to perform an exclusive OR operation on the third to-be-coded data and the first network coded data to obtain the second to-be-coded data.

In a possible implementation, before receiving the first indication information from the network device, the transceiver module 802 is further configured to send first information to the network device, where the first information includes at least one of: first request information, an interference level of the communication apparatus, and a processing capability of the communication apparatus, where the first request information is used to request whether to preprocess the phase of the first to-be-coded data, and the first information is used to determine the first indication information.

In a possible implementation, before receiving the fourth indication information from the network device, the transceiver module 802 is further configured to send first communication quality of a downlink data channel between the network device, the electromagnetic hypersurface array antenna, and the communication apparatus to the network device, where the first communication quality is used to determine the second transmission resource.

In a possible implementation, the processing module 801 is further configured to perform an exclusive OR operation on the third to-be-coded data and the first network coded data to obtain the second to-be-coded data.

In embodiments, the communication apparatus 80 is presented in a form of functional modules obtained through division in an integrated manner. The "module" herein may be an ASIC, a circuit, a processor that executes one or more software or firmware programs, a memory, an integrated logic circuit, and/or another component that can provide the foregoing functions.

Specifically, a function/implementation process of the processing module 801 in FIG. 8 may be implemented by a processor in the terminal device by invoking computer-executable instructions stored in a memory. A function/implementation process of the transceiver module 802 in FIG. 8 may be implemented by using a radio frequency (RF) circuit in the terminal device.

Because the communication apparatus 80 provided in this embodiment may perform the foregoing method, for a technical effect that can be achieved by the communication apparatus 80, refer to the foregoing method embodiments. Details are not described herein again.

Figure 9:
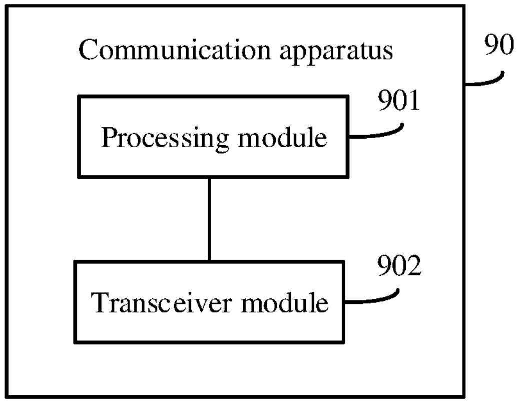
FIG. 9 is a second schematic diagram of a structure of a communication apparatus according to an embodiment of this application.

The communication apparatus is the network device in the foregoing method embodiment. FIG. 9 is a schematic diagram of a structure of a communication apparatus 90. The communication apparatus 90 includes a processing module 901 and a transceiver module 902. The communication apparatus 90 may be the network device in FIG. 2. The processing module 901 may also be referred to as a processing unit, and is configured to implement a processing function of the network device in the foregoing method embodiments, for example, perform step S4033 in FIG. 4B-1 and FIG. 4B-2. The transceiver module 902 may also be referred to as a transceiver unit, and is configured to implement a transceiver function of the network device in the foregoing method embodiments, for example, perform steps S401, S402, and S404 in FIG. 4A, or steps S401, S402, S4031, S4034, S4035, and S404 in FIG. 4B-1 and FIG. 4B-2. The transceiver module 902 may be referred to as a transceiver circuit, a transceiver machine, a transceiver, or a communication interface.

For example, the transceiver module 902 is configured to send first indication information to a first terminal device, or the transceiver module 902 is configured to send third indication information to the first terminal device and a second terminal device, where the third indication information indicates the first terminal device to negotiate a first transmission resource of the first indication information or second indication information with the second terminal device. The first indication information indicates to preprocess a phase of first to-be-coded data to be sent by the first terminal device, and the second indication information indicates not to preprocess a phase of second to-be-coded data to be sent by the second terminal device; or the first indication information indicates not to preprocess a phase of first to-be-coded data to be sent by the first terminal device, and the second indication information indicates to preprocess a phase of second to-be-coded data to be sent by the second terminal device.

In a possible implementation, for sending the first indication information to the first terminal device, the transceiver module 902 is further configured to send the second indication information to the second terminal device.

In a possible implementation, the transceiver module 902 is further configured to send fourth indication information to the first terminal device and the second terminal device, where the fourth indication information indicates a second transmission resource that carries data transmitted between the first terminal device and the second terminal device through an electromagnetic hypersurface array antenna.

In a possible implementation, the transceiver module 902 is further configured to obtain first communication quality of a data channel between the electromagnetic hypersurface array antenna and the first terminal device, and second communication quality of a data channel between the electromagnetic hypersurface array antenna and the second terminal device.

In a possible implementation, the transceiver module 902 is further configured to: obtain first communication quality of an uplink data channel between the electromagnetic hypersurface array antenna and the first terminal device from the electromagnetic hypersurface array antenna; and obtain second communication quality of an uplink data channel between the electromagnetic hypersurface array antenna and the second terminal device from the electromagnetic hypersurface array antenna.

In a possible implementation, the transceiver module 902 is further configured to: obtain first communication quality of a downlink data channel between the communication apparatus, the electromagnetic hypersurface array antenna, and the first terminal device from the first terminal device; and obtain second communication quality of a downlink data channel between the communication apparatus, the electromagnetic hypersurface array antenna, and the second terminal device from the second terminal device.

In a possible implementation, the transceiver module 902 is further configured to send a configuration parameter to the electromagnetic hypersurface array antenna based on the first communication quality and the second communication quality, where the configuration parameter is used to adjust a phase of each antenna unit in the electromagnetic hypersurface array antenna.

In a possible implementation, before the transceiver module 902 sends the first indication information to the first terminal device, the transceiver module 902 is further configured to receive first information from the first terminal device, where the first information includes at least one of: first request information, an interference level of the first terminal device, and a processing capability of the first terminal device, where the first request information is used to request whether to preprocess the phase of the first to-be-coded data. The transceiver module 902 is further configured to receive second information from the second terminal device, where the second information includes at least one of: second request information, an interference level of the second terminal device, and a processing capability of the second terminal device, where the second request information is used to request whether to preprocess the phase of the second to-be-coded data. The processing module 901 is configured to determine the first indication information and the second indication information based on the first information and the second information.

In embodiments, the communication apparatus 90 is presented in a form of functional modules obtained through division in an integrated manner. The "module" herein may be an ASIC, a circuit, a processor that executes one or more software or firmware programs, a memory, an integrated logic circuit, and/or another component that can provide the foregoing functions.

Specifically, a function/implementation process of the processing module 901 in FIG. 9 may be implemented by a processor in the network device by invoking computer-executable instructions stored in a memory. Alternatively, a function/implementation process of the transceiver module 902 in FIG. 9 may be implemented by using an RF circuit in the network device.

Because the communication apparatus 90 provided in this embodiment may perform the foregoing method, for a technical effect that can be achieved by the communication apparatus 90, refer to the foregoing method embodiments. Details are not described herein again.

Figure 10:
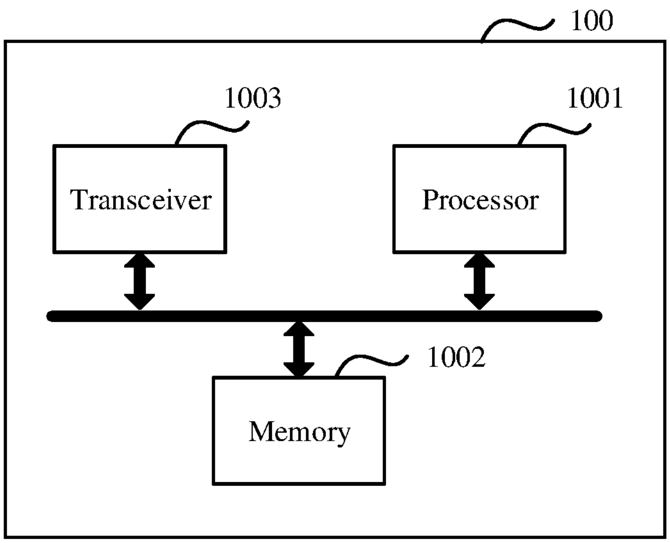
FIG. 10 is a third schematic diagram of a structure of a communication apparatus according to an embodiment of this application.

As shown in FIG. 10, an embodiment of this application further provides a communication apparatus. The communication apparatus 100 includes a processor 1001, a memory 1002, and a transceiver 1003. The processor 1001 is coupled to the memory 1002. When the processor 1001 executes a computer program or instructions in the memory 1002, the method corresponding to the first terminal device or the second terminal device in FIG. 4A or FIG. 4B-1 and FIG. 4B-2 is performed.

Figure 11:
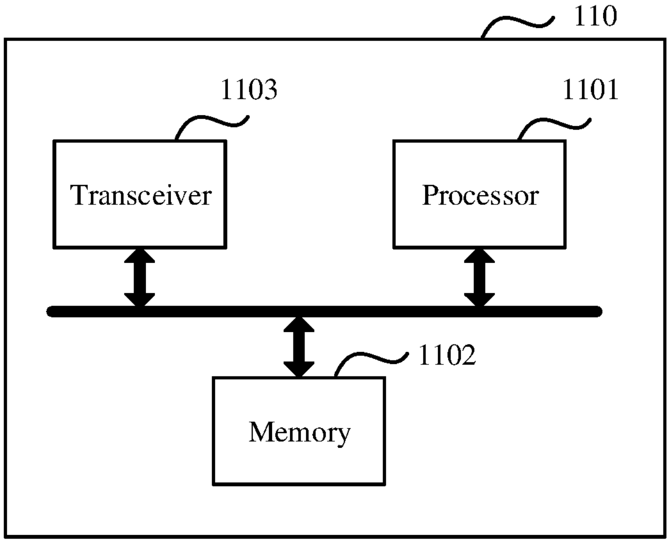
FIG. 11 is a fourth schematic diagram of a structure of a communication apparatus according to an embodiment of this application.
Figure 12:
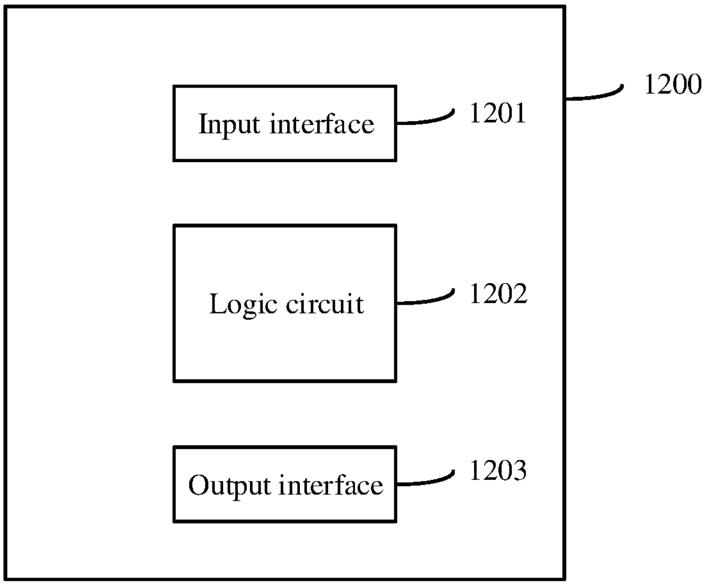
FIG. 12 is a schematic diagram of a structure of an apparatus according to an embodiment of this application.

As shown in FIG. 11, an embodiment of this application further provides a communication apparatus. The communication apparatus 110 includes a processor 1101, a memory 1102, and a transceiver 1103. The processor 1101 is coupled to the memory 1102. When the processor 1101 executes a computer program or instructions in the memory 1102, the method corresponding to the network device in FIG. 4A or FIG. 4B-1 and FIG. 4B-2 is performed. As shown in FIG. 12, an embodiment of this application further provides an apparatus 1200, which may be configured to perform the method performed by the foregoing terminal device or network device. The apparatus 1200 may be a communication device or a chip in the communication device. The apparatus 1200 includes at least one input interface (input(s)) 1201, a logic circuit 1202, and at least one output interface (output(s)) 1203. Optionally, the logic circuit 1202 may be a chip or another integrated circuit that can implement the method in this application.

The logic circuit 1202 can implement the method performed by the terminal device or the network device in the foregoing embodiments.

The input interface 1201 is configured to receive data, and the output interface 1203 is configured to send data. For example, when the apparatus 1200 is a terminal device, the input interface 1201 may be configured to receive first indication information, second indication information, third indication information, and fourth indication information that are sent by a network device, and may be further configured to receive first network coded data sent by an electromagnetic hypersurface array antenna. The output interface 1203 may be configured to send first communication quality, second communication quality, first information, and second information to the network device, and may be further configured to send first to-be-coded data and second to-be-coded data to the electromagnetic hypersurface array antenna. When the apparatus 1200 is a network device, the input interface 1201 may be configured to receive first information and second information from a terminal device, and may be further configured to receive first communication quality and second communication quality from the terminal device or an electromagnetic hypersurface array antenna. The output interface 1203 may be configured to send first indication information, second indication information, third indication information, and fourth indication information to the terminal device, and may be further configured to send a configuration parameter to the electromagnetic hypersurface array antenna.

For functions of the input interface 1201, the logic circuit 1202, or the output interface 1203, refer to the method performed by the terminal device or the network device in the foregoing embodiments. Details are not described herein again.

An embodiment of this application further provides a computer-readable storage medium. The computer-readable storage medium stores a computer program. When the computer-readable storage medium is run on a computer or a processor, the method corresponding to the first terminal device or the second terminal device in FIG. 4A or FIG. 4B-1 and FIG. 4B-2 is performed.

An embodiment of this application further provides a computer-readable storage medium. The computer-readable storage medium stores a computer program. When the computer-readable storage medium is run on a computer or a processor, the method corresponding to the network device in FIG. 4A or FIG. 4B-1 and FIG. 4B-2 is performed.

An embodiment of this application further provides a computer program product including instructions. When the instructions are run on a computer or a processor, the method corresponding to the first terminal device or the second terminal device in FIG. 4A or FIG. 4B-1 and FIG. 4B-2 is performed.

An embodiment of this application further provides a computer program product including instructions. When the instructions are run on a computer or a processor, the method corresponding to the network device in FIG. 4A or FIG. 4B-1 and FIG. 4B-2 is performed.

An embodiment of this application provides a chip system. The chip system includes a processor, configured to perform the method corresponding to the first terminal device or the second terminal device in FIG. 4A or FIG. 4B-1 and FIG. 4B-2, or perform the method corresponding to the network device in FIG. 4A or FIG. 4B-1 and FIG. 4B-2.

In a possible design, the chip system further includes a memory, and the memory is configured to store necessary program instructions and necessary data. The chip system may include a chip and an integrated circuit, or may include a chip and another discrete device. This is not specifically limited in this embodiment of this application.

The communication apparatus, the chip, the computer storage medium, the computer program product, or the chip system provided in this application are all configured to perform the foregoing method. Therefore, for beneficial effects that can be achieved by the communication apparatus, the chip, the computer storage medium, the computer program product, or the chip system, refer to beneficial effects in the foregoing implementations. Details are not described herein again.

The processor in embodiments of this application may be a chip. For example, the processor may be a field programmable gate array (FPGA), an application-specific integrated chip (ASIC), a system on chip (SoC), a central processing unit (CPU), a network processor NP), a digital signal processing circuit (digital signal processor, DSP), a micro controller unit (MCU), a programmable controller (PLD), or another integrated chip.

The memory in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memories in the systems and methods described in this specification include but are not limited to these memories and any memory of another suitable type.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, devices, and methods may be implemented in other manners. For example, the described device embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit.

All or some of foregoing embodiments may be implemented by using software, hardware, firmware, or any combination thereof. When a software program is used to implement embodiments, all or a part of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network coding method, comprising:

determining, by a first terminal side apparatus, first indication information, wherein the first indication information indicates whether or not to preprocess a phase of first to-be-coded data to be sent by the first terminal side apparatus by shifting a phase of an analog signal corresponding to the first to-be-coded data by an angle; and transmitting, by the first terminal side apparatus, data to a second terminal side apparatus in a same slot of a second transmission resource through an electromagnetic hypersurface array antenna comprising antenna units made of different metamaterials, by performing operations comprising:

sending, by the first terminal side apparatus, third to-be-coded data to the electromagnetic hypersurface array antenna in the same slot of the second transmission resource, and receiving first network coded data from the electromagnetic hypersurface array antenna in the first same slot of the second transmission resource, wherein the third to-be-coded data is obtained based on the first indication information and the first to-be-coded data, wherein the first network coded data is generated based on time-domain superposition, and sending data, performing network coding, and receiving data are completed in the same slot of the second transmission resource; and obtaining, by the first terminal side apparatus, second to-be-coded data from the second terminal side apparatus based on the third to-be-coded data and the first network coded data, wherein each of the first terminal side apparatus and the second terminal side apparatus is a terminal device, or a chip or circuit within a terminal device.

2. The method according to claim 1, wherein the determining, by a first terminal side apparatus, first indication information comprises:

receiving, by the first terminal side apparatus, the first indication information from a network side apparatus, wherein the network side apparatus is a network device or a chip or circuit within a network device.

3. The method according to claim 1, wherein before the receiving, by the first terminal side apparatus, the first indication information from a network side apparatus, the method further comprises:

sending, by the first terminal side apparatus, first information to the network side apparatus, wherein the first information comprises at least one of: first request information, an interference level of the first terminal side apparatus, or a processing capability of the first terminal side apparatus, wherein the first request information requests whether to preprocess the phase of the first to-be-coded data, and the first indication information is determined using the first information.

4. The method according to claim 1, wherein the determining, by a first terminal side apparatus, first indication information comprises:

receiving, by the first terminal side apparatus, third indication information from a network side apparatus, wherein the third indication information indicates the first terminal side apparatus to negotiate a first transmission resource of the first indication information with the second terminal side apparatus; and determining, by the first terminal side apparatus, the first indication information based on a result of the negotiation with the second terminal side apparatus on the first transmission resource, wherein the network side apparatus is a network device or a chip or circuit within a network device.

5. The method according to claim 1, further comprising:

receiving, by the first terminal side apparatus, fourth indication information from a network side apparatus, wherein the fourth indication information indicates the second transmission resource.

6. The method according to claim 5, wherein before the receiving, by the first terminal side apparatus, fourth indication information from a network side apparatus, the method further comprises:

sending, by the first terminal side apparatus to the network side apparatus, first communication quality of a downlink data channel between the network side apparatus, the electromagnetic hypersurface array antenna, and the first terminal side apparatus, wherein the second transmission resource is determined using the first communication quality.

7. The method according to claim 1, wherein the obtaining, by the first terminal side apparatus, second to-be-coded data from the second terminal side apparatus based on the third to-be-coded data and the first network coded data comprises:

performing, by the first terminal side apparatus, an exclusive OR operation on the third to-be-coded data and the first network coded data to obtain the second to-be-coded data.

8. A network coding method, comprising:

sending, by a network side apparatus, first indication information to a first terminal side apparatus, and sending, by the network side apparatus, second indication information to a second terminal side apparatus; or sending, by the network side apparatus, third indication information to the first terminal side apparatus and the second terminal side apparatus, wherein the third indication information indicates the first terminal side apparatus to negotiate a first transmission resource of the first indication information or the second indication information with the second terminal side apparatus, wherein the first indication information indicates to preprocess a phase of first to-be-coded data to be sent by the first terminal side apparatus, and the second indication information indicates not to preprocess a phase of second to-be-coded data to be sent by the second terminal side apparatus; or the first indication information indicates not to preprocess a phase of first to-be-coded data to be sent by the first terminal side apparatus, and the second indication information indicates to preprocess a phase of second to-be-coded data to be sent by the second terminal side apparatus, wherein preprocessing the phase of the first to-be-coded data or the second to-be-coded data comprises shifting a phase of an analog signal corresponding to the first to-be-coded data or the second to-be-coded data by an angle, wherein data is transmitted between the first terminal side apparatus and the second terminal side apparatus in a same slot of a second transmission resource through an electromagnetic hypersurface array antenna comprising antenna units made of different metamaterials, wherein first network coded data is generated based on time-domain superposition, and wherein sending data, performing network coding, and receiving data are completed in the same slot of the second transmission resource, wherein each of the first terminal side apparatus and the second terminal side apparatus is a terminal device, or a chip or circuit within a terminal device, and the network side apparatus is a network device, or a chip or circuit within a network device.

9. The method according to claim 8, further comprising:

sending, by the network side apparatus, fourth indication information to the first terminal side apparatus and the second terminal side apparatus, wherein the fourth indication information indicates a second transmission resource that carries data transmitted between the first terminal side apparatus and the second terminal side apparatus through the electromagnetic hypersurface array antenna.

10. The method according to claim 9, further comprising:

obtaining, by the network side apparatus, first communication quality of a data channel between the electromagnetic hypersurface array antenna and the first terminal side apparatus, and second communication quality of a data channel between the electromagnetic hypersurface array antenna and the second terminal side apparatus.

11. The method according to claim 10, wherein the obtaining, by the network side apparatus, first communication quality of a data channel between the electromagnetic hypersurface array antenna and the first terminal side apparatus, and second communication quality of a data channel between the electromagnetic hypersurface array antenna and the second terminal side apparatus comprises:

obtaining, by the network side apparatus, first communication quality of an uplink data channel between the electromagnetic hypersurface array antenna and the first terminal side apparatus from the electromagnetic hypersurface array antenna; and obtaining, by the network side apparatus, second communication quality of an uplink data channel between the electromagnetic hypersurface array antenna and the second terminal side apparatus from the electromagnetic hypersurface array antenna.

12. The method according to claim 10, wherein the obtaining, by the network side apparatus, first communication quality of a data channel between the electromagnetic hypersurface array antenna and the first terminal side apparatus, and second communication quality of a data channel between the electromagnetic hypersurface array antenna and the second terminal side apparatus comprises:

obtaining, by the network side apparatus, first communication quality of a downlink data channel between the network side apparatus, the electromagnetic hypersurface array antenna, and the first terminal side apparatus from the first terminal side apparatus; and obtaining, by the network side apparatus, second communication quality of a downlink data channel between the network side apparatus, the electromagnetic hypersurface array antenna, and the second terminal side apparatus from the second terminal side apparatus.

13. A communication apparatus, comprising at least one processor, wherein the at least one processor is coupled to a memory, the memory is configured to store a computer program that, when executed by the at least one processor, causes the communication apparatus to:

determine first indication information, wherein the first indication information indicates whether or not to preprocess a phase of first to-be-coded data to be sent by the communication apparatus by shifting a phase of an analog signal corresponding to the first to-be-coded data by an angle; and transmit data to a second terminal side apparatus in a same slot of a second transmission resource through an electromagnetic hypersurface array antenna comprising antenna units made of different metamaterials by performing operations comprising:

sending third to-be-coded data to the electromagnetic hypersurface array antenna in the same slot of the second-transmission resource, and receiving first network coded data from the electromagnetic hypersurface array antenna in the same slot of the second transmission resource, wherein the third to-be-coded data is obtained based on the first indication information and the first to-be-coded data, wherein the first network coded data is generated based on time-domain superposition, and wherein sending data performing network coding, and receiving data are completed in the same slot of the second transmission resource; and obtaining second to-be-coded data from the second terminal side apparatus based on the third to-be-coded data and the first network coded data, wherein the second terminal side apparatus is a terminal device or a chip or circuit within a terminal device.

14. The communication apparatus according to claim 13, wherein the computer program, when executed by the at least one processor, further causes the communication apparatus to:

receive the first indication information from a network side apparatus, wherein the network side apparatus is a network device or a chip or circuit within a network device.

15. The communication apparatus according to claim 13, wherein the computer program, when executed by the at least one processor, further causes the communication apparatus to:

send first information to a network side apparatus, wherein the first information comprises at least one of: first request information, an interference level of the communication apparatus, or a processing capability of the communication apparatus, wherein the first request information requests whether to preprocess the phase of the first to-be-coded data, and the first indication information is determined using the first information, wherein the network side apparatus is a network device or a chip or circuit within a network device.

16. The communication apparatus according to claim 13, wherein the computer program, when executed by the at least one processor, further cause-causes the communication apparatus to:

receive third indication information from a network side apparatus, wherein the third indication information indicates the communication apparatus to negotiate a first transmission resource of the first indication information with the second terminal side apparatus; and determine the first indication information based on a result of the negotiation with the second terminal side apparatus on the first transmission resource, wherein the network side apparatus is a network device or a chip or circuit within a network device.

17. The communication apparatus according to claim 13, wherein the computer program, when executed by the at least one processor, further cause-causes the communication apparatus to:

receive fourth indication information from a network side apparatus, wherein the fourth indication information indicates the second transmission resource, wherein the network side apparatus is a network device or a chip or circuit within a network device.

18. The communication apparatus according to claim 17, wherein the computer program, when executed by the at least one processor, further causes the communication apparatus to:

send, to the network side apparatus, first communication quality of a downlink data channel between the network side apparatus, the electromagnetic hypersurface array antenna, and the communication apparatus before receiving the fourth indication information from the network side apparatus, wherein the second transmission resource is determined using the first communication quality.

19. The communication apparatus according to claim 13, wherein the computer program, when executed by the at least one processor, further causes the communication apparatus to:

perform an exclusive OR operation on the third to-be-coded data and the first network coded data to obtain the second to-be-coded data.

* * * * *